(12) United States Patent
Abedi

(10) Patent No.: US 8,311,554 B2
(45) Date of Patent: Nov. 13, 2012

(54) METHOD AND APPARATUS FOR PERFORMING DYNAMIC SHARED SPECTRUM ALLOCATION BETWEEN TWO OVERLAPPING WIRELESS COMMUNICATION SYSTEMS

(75) Inventor: Saied Abedi, Reading (GB)

(73) Assignee: Fujitsu Limited, Kawasaki (JP)

( * ) Notice: Subject to any disclaimer, the term of this patent is extended or adjusted under 35 U.S.C. 154(b) by 511 days.

(21) Appl. No.: 12/360,373

(22) Filed: Jan. 27, 2009

(65) Prior Publication Data

US 2009/0191888 A1 Jul. 30, 2009

(30) Foreign Application Priority Data

Jan. 28, 2008 (GB) .................... 0801534.9

(51) Int. Cl.
*H04W 72/00* (2009.01)
(52) U.S. Cl. ........ 455/454; 455/450; 455/464; 455/509; 370/328; 370/230; 370/252
(58) Field of Classification Search .................. 370/338, 370/230, 252; 455/451, 464, 509, 450
See application file for complete search history.

(56) References Cited

U.S. PATENT DOCUMENTS

| 5,710,973 | A | 1/1998 | Yamada et al. | |
|---|---|---|---|---|
| 2002/0186710 | A1 | 12/2002 | Alvesalo et al. | |
| 2007/0117537 | A1* | 5/2007 | Hui et al. | 455/405 |
| 2007/0281710 | A1* | 12/2007 | Bai et al. | 455/452.1 |
| 2007/0287469 | A1 | 12/2007 | Wijting et al. | |

FOREIGN PATENT DOCUMENTS

| EP | 1 863 303 | 5/2007 |
|---|---|---|
| JP | 2007-325260 | 12/2007 |
| JP | 2007325260(A) | * 12/2007 |
| WO | 99/17575 | 4/1999 |
| WO | 2007/005181 | 1/2007 |
| WO | 2007/122297 | 11/2007 |

OTHER PUBLICATIONS

Translation of an Office Action of JPO—Notification of REasons for Resusal.*
UK Intellectual Property Office Search Report for corresponding Application No. GB0801534.9; date of search May 16, 2008.
Extended European Search Report Correspondence and Annex to the European Search Report for corresponding European Patent Application No. 08172981.6, with a mail date of Sep. 14, 2009.
Notification of Reasons for Refusal issued for corresponding Japanese Patent Application No. 2009-015919 mailed Aug. 21, 2012 with English translation.

* cited by examiner

*Primary Examiner* — Meless N Zewdu
*Assistant Examiner* — Quan Hua
(74) *Attorney, Agent, or Firm* — Myers Wolin, LLC

(57) ABSTRACT

Controlling spectrum use in a first wireless communications system which takes part in a spectrum assignment process, in which one of the first wireless communications system and a second wireless communications system assigns a portion of spectrum to the other of the first and second wireless communications system. The first wireless communications system includes a plurality of network elements some or all located within a cell associated with a particular network element of the second wireless communications system. The controlling includes coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system.

12 Claims, 17 Drawing Sheets

METHOD AND APPARATUS FOR PERFORMING DYNAMIC SHARED SPECTRUM ALLOCATION BETWEEN TWO OVERLAPPING WIRELESS COMMUNICATION SYSTEMS

This application claims priority to United Kingdom Application No. 0801534.9 filed on Jan. 28, 2008, the disclosure of which is expressly incorporated herein by reference in its entirety.

The invention relates to a method of, and apparatus for, controlling spectrum use in a wireless communications system.

BACKGROUND

Recent studies worldwide indicate that while some systems and mobile operators are in desperate need for more efficient utilization of spectrum resources, most of the radio spectrum resources remain underutilized or unused most of the time. The increasing demand for flexible use of the radio spectrum for emerging new services and applications is the motivation behind numerous research activities worldwide. Efficient access to radio spectrum resources will generate new sources of revenues for worldwide vendors and wireless network operators. The new design of wireless radio infrastructure outlines the new attempts to share the spectrum in a fundamentally new fashion which would ultimately lead to better utilization of spectrum. The proposed spectrum management architectures and the spectrum sharing functionalities developed recently will result in reducing the time required to tailor a new service to an operator network. Furthermore, the flexible spectrum access and usage leads to more capable and faster services with high Quality of Service (QoS), giving more user satisfaction than conventional networks.

Four different levels of spectrum management techniques have been introduced in three different time scales: Spectrum Sharing and Coexistence (couple of hours or days), Long Term Spectrum Assignment (couple of minutes), Short Term Spectrum Assignment (1 sec or tens of ms) and fast dynamic spectrum allocation (10 ms time scale or even below). One of the elements included in this system is the concept of a gateway, which provides for LT spectrum assignment and some radio resource management (RRM) algorithms. One of the most challenging scenarios for spectrum sharing is short-term inter-mode spectrum assignment in a hierarchical overlaid cellular network. Unlike the intra-RAN spectrum sharing and exchange, where adjacent cells are exchanging spectrum, in a hierarchical overlaid cellular network, where the cells are no longer adjacent and are overlapped, the short-term and long-term spectrum assignment are challenging tasks. When, for example, Metropolitan Area (MA) cells with Time Division Duplex (TDD) operations are located within a Wide Area (WA) cell with Frequency Division Duplex (FDD) operations, and an MA cell or base station is to assign a chunk of spectrum to a WA cell, since all the MA cells are surrounded by WA cells, any allocation of spectrum to WA cells would ultimately lead to severe interference being inflicted on other MA cells. FIG. 1 shows a hierarchical overlaid cellular network having three WA cells WA1-3 having respective base stations BS1-3 each operating using an FDD mode. MA cells MA1-3 of a first MAN are located within cell WA1, MA cells MA4-6 of a second MAN are located within WA cell WA2, and MA cells MA7-9 of a third MAN are located within WA cell WA3. Since each MA cell uses a TDD mode, and the three MANs are geographically separated, each MA cell is able to operate within the same spectrum band.

There may be a situation in which one of the cells (say for example MA1 in FIG. 1) has spectrum resources available for sharing and allocation to WA1. Referring to FIG. 2, if the spectrum assignment (indicated by solid arrows) happens without coordination with other involved MA cells, the result is severe interference from the WA cell on the cells MA2 and MA3. The dotted lines in FIG. 2 indicate the interference and the portions of spectrum in which it may occur. As shown in FIG. 2, use by the cell WA1 of the chunks of spectrum assigned from MA1 to WA1 has caused interference on MA2 and MA3 as the latter cells are still operating in TDD mode within the chucks of spectrum given away by MA1. Unlike adjacent cells, which can be separated from each other by employing a safe separation distance or an exclusion zone, for the hierarchical overlaid cellular network, the proposed safe separation distances or exclusion zones are difficult to realize.

FIG. 3 shows a situation in which the assignment of spectrum to WA1 has resulted in interference (indicated again by dotted arrows) on MA cells within other MANs located in other WA cells. If the MA cells in the other WA cells are located far enough from WA1, the interference may not be critical.

SUMMARY

According to a first aspect, there is provided a method of controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the method comprising performing a group coordinated process comprising coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process.

In this way, the method may avoid the potential collision of interests in a cluster of cells (say for example a group of MA cells) surrounded by a cell as an interested party (e.g. a WA cell).

The method may allow for potential redundant spectrum to be exploited in order to provide better spectrum availability for all the parties involved. It may provide a further fine tuning to long-term spectrum assignment (when performed as a short-term spectrum assignment), improving the QoS and SIR ratio, the overall network coverage, throughput, and the revenue for the borrowing party by making sure that the radio resource is available when needed at peak times. An extra source of income for operators as the lending party may be provided by making sure that the redundant radio spectrum is not wasted and employed in an efficient way. The method may reduce the potential call blockage especially at the cell edge by providing better and more efficient access to more radio resources. The method may provide for better interference management.

The term "wireless communications system" may relate to a wireless access network, for example a radio access network (RAN), including all of the elements of the network, for example base stations. The radio access network may be a metropolitan-area network or a wide-area network, for example. In another arrangement, it may relate to an RFID tag reader, to a sink or wireless sensor network base station, or to a group of such readers forming a network, possibly including other equipment, e.g. control circuitry. It may also relate to a WiMAX network. The first wireless communications system may be a micro network and the second wireless communications system may be macro network. The first wireless communications system may be a metropolitan-area network and the second wireless communications system may be wide-area network.

The spectrum assignment process may comprise the re-assignment of a portion of a spectrum band which has been pre-assigned to one of the first and the second wireless communications system from the one wireless communications system to the other of the first and second wireless communications systems. In other words, where a first spectrum band has been pre-assigned to the first wireless communications system, and a second spectrum band has been pre-assigned to the second wireless communications system, the spectrum assignment process may comprise (for example during negotiations between the first and second wireless communications systems) re-assigning, from one of the first and second wireless communications systems to the other of the first and second wireless communications systems, some or all of the respective first or second pre-assigned spectrum band. By "pre-assigned" it may be meant that the wireless communications system to which the spectrum band has been pre-assigned is licensed for operation within that spectrum band. The act of assigning a portion of spectrum from one system to another may comprise the one system giving permission to the other system to use the assigned portion of spectrum, whereafter the one system ceases to operate using the assigned portion, while the other system may choose to operate using the assigned portion if desired. The spectrum assignment process may relate in particular to a short-term spectrum assignment process (1 sec or 10s of milliseconds timescale) forming part of a larger spectrum sharing scheme further including at least a long-term spectrum assignment process. The spectrum assignment process may involve at least three wireless communications systems including the first and second wireless communications system. The term "instance" when used in relation to the spectrum assignment process may refer to a single assignment of spectrum by means of the spectrum assignment process.

By "spectrum" there may be meant radio frequencies or any other range of frequencies of electromagnetic radiation suitable for communication. For example, the first and second wireless communications systems may be radio access networks (RANs) operating within the radio frequency range of the electromagnetic spectrum. Additionally or alternatively, the wireless communications systems may operate within a microwave frequency range, for example.

The terms "portion" or "band" when used in relation to spectrum may relate to a particular range of frequencies, which may consist of a single, continuous range of frequencies, or two or more separate, continuous ranges. The terms "chunk" and "sub-chunk" may also refer to portions or bands of spectrum.

The network elements of the first wireless communications system all operate within the same spectrum band when in use. The first wireless communications system may operate using a TDD mode (and a TDMA mode), meaning that the different network elements of the first wireless communications system are able to transmit using the same spectrum band by synchronising their activities and transmitting or receiving in different time slots.

By "available for assignment" it is meant that the first wireless communications system would be capable of assigning the portion of spectrum and still meeting certain predetermined service requirements, for example a traffic delivery success ratio. In other words, the portion of spectrum, when available for assignment, is superfluous to the requirements of the first wireless communications system, such that the first wireless communications system can benefit from revenue generated by assigning the portion.

Similarly, by "required to be assigned" it is meant that the first wireless communications system needs the additional portion of spectrum to meet the same predetermined service requirements.

The term "trigger" when used herein may relate to any signal, processing result, stimulus or circumstance, whether internal or external to the first wireless communications system, in response to which a wireless communications system may desire to undertake an instance of the spectrum assignment process. A trigger may cause activation of a spectrum assignment algorithm.

The term "mobile communications apparatus", when used herein, may relate to wireless equipment which is capable of undertaking wireless communications with one or both of the wireless communications systems. For example, the term may relate to user equipment (user -portable wireless equipment), for example a mobile telephone, personal digital assistant, laptop or PC, to an RFID tag/node or wireless sensor node, or to a device having WiMAX functionality.

The step of coordinating network elements may involve any amount of signalling, communications, use of predetermined arrangements or control operations whereby the situation, condition and operational parameters of each network element of the first wireless communications system may be taken into account for the purposes of the spectrum assignment process, in order that all appropriate network elements may benefit from the spectrum assignment process, or at least in order to avoid any network element being substantially harmed by it (for example by suffering an increased level of interference). By "appropriate" network element is meant any network element in active operation using the same or similar spectrum bands to the other network elements: inactive network elements or those operating within a spectrum band not likely to result in interference problems may be ignored.

The step of identifying a portion of spectrum may comprise determining an amount of spectrum and/or its position in relation to other portions of spectrum in a spectrum configuration. The term "spectrum configuration" may relate to an arrangement of one or more portions of spectrum, and may specify one or both of the amount of spectrum in each portion and/or its position in relation to other portions of spectrum in the spectrum configuration. For example, by defining each portion of spectrum with reference to its upper and lower limits, it is possible to indicate both the size of the portion and its position in relation to other portions of spectrum. A portion of spectrum may also be identified by reference to its size and/or a spectrum ID. A spectrum ID may be a number assigned to each sub-chunk, selected from a range of possibilities. The arrangement whereby sub-chunks are given spectrum IDs may be decided before or during the spectrum assignment process. A spectrum configuration may comprise one or more guard bands, and one or more regions of licensed/unlicensed spectrum. In addition, the spectrum configuration may comprise information which associates each portion of spectrum with a respective entity, which may be a wireless communications system (e.g. a radio access network) or part thereof, a cell or base station or a group of cluster thereof, or an uplink or downlink belonging to any such entity.

Thus, the method provides for an efficient inter-mode spectrum assignment in hierarchical overlaid cellular networks, a concept of spectrum sharing between macrocells and microcells where microcells are overlaid with a macrocell. The microcells may be operating in TDD mode and the macrocells may be operating in FDD mode. The short-term spectrum assignment may be between the TDD and FDD modes in the critical and practical case when cells involved in the spectrum assignment process are no longer adjacent and negotiating parties might be surrounded by a bigger cell with no exclusion zone possible, for example between MA cells located within a WA deployment.

Two triggers for the spectrum assignment process are disclosed, and one or both may be employed. The method of the first aspect may form part of a response to the first trigger type, or may form part of the actions of the second trigger type itself. The method of the second aspect, defined below, may form part of the actions of the first trigger type itself, or may form part of a response to the second trigger type. Each trigger type may be based on traffic levels. One trigger type may comprise traffic buffer occupancy exceeding a threshold in a macrocell (e.g. a cell of the second wireless communications system). Another trigger type may comprise overall traffic buffer occupancy exceeding a threshold in a group of microcells (e.g. cells of the first wireless communications system). The method may comprise periodic or continuous monitoring of traffic buffers, including periodic analysis of overall traffic load in the group of microcells that are covered by the macrocell. The method may comprise converting the overall traffic load to having insufficient spectrum or having sufficient spectrum.

The method may comprise, in the group coordinated process, coordinating the network elements of the first wireless communications system to identify a portion of spectrum which is available for assignment, in the spectrum assignment process, from the network elements of the first wireless communications system to the particular network element of the second wireless communications system. Furthermore, coordinating the network elements of the first wireless communications system to identify the portion of spectrum may comprise identifying a portion of spectrum which is the minimum amount of spectrum available for assignment from the network elements of the first wireless communications system. In this way, once the portion of spectrum has been assigned, interference in the first wireless communications system resulting from communications by the particular network element of the second wireless communications system using the assigned portion of spectrum can be reduced or avoided. The method may provide for higher throughput, more resources of spectrum, better interference management and better Quality of Service (QoS) for the users.

The method may include any appropriate way of identifying the portion of spectrum which is the minimum amount of spectrum available for assignment from the network elements of the first wireless communications system. In one arrangement, this step may comprise analysing a traffic buffer load of each of the network elements of the first wireless communications system, determining an amount of spectrum required by each of the network elements of the first wireless communications system in dependence on the respective traffic buffer load, comparing each required amount of spectrum for the respective network element with an amount of spectrum currently assigned to the first communications system to obtain a difference for each network element, and selecting a minimum difference to identify the said minimum amount of spectrum. Determining the amount of spectrum required by each of the network elements of the first wireless communications system in dependence on the respective traffic buffer load may comprise mapping the traffic buffer load of each of the network elements to the respective amount of spectrum using a look-up table. In another arrangement, an algorithm may be used.

Additionally or alternatively, the method may comprise, in the group coordinated process, coordinating the network elements of the first wireless communications system to identify a portion of spectrum which is required to be assigned from the particular network element of the second wireless communications system to the network elements of the first wireless communications system. In this way, the method may provide for higher throughput, more resources of spectrum, better interference management and better Quality of Service (QoS) for the users.

As mentioned, the method may relate only to operational/active network elements and those operating within a spectrum band which has the potential to result in interference problems following the assignment. In one arrangement, however, coordinating the network elements of the first wireless communications system may comprise identifying a portion of spectrum which is either available for assignment from each of the network elements of the first wireless communications system to the particular network element of the second wireless communications system, or required to be assigned from the particular network element of the second wireless communications system to each of the network elements of the first wireless communications system. By assigning the portion from/to each of the network elements of the first wireless communications system, the potential for a damaging conflict of interests may be decreased.

Any suitable means of coordinating the network elements may be employed. In one arrangement, coordinating the network elements of the first wireless communications system may comprise operating one of the network elements of the first wireless communications system to coordinate other network elements of the first wireless communications system. Moreover, the one network element may be a lead network element of the first wireless communications system. In this way, the one network element serves as a group leader and the task of coordination may be simplified.

The coordination of the network elements of the first wireless communications system may be based on any appropriate strategy intended to minimise the disruption, particularly, in terms of interference, to those network elements following the spectrum assignment process. Preferably, the coordination takes into account traffic levels at each of the network elements to calculate how much spectrum may be assigned (or how much is needed), to avoid assigning too much and causing interference (as a result of an overlap of the spectrum used by one of the network elements of the first wireless communications system and by the particular network element of the second wireless communications system). In one arrangement, the method may comprise transmitting from the one network element of the first wireless communications system to the other network elements signalling which indicates the start of the group coordinated process, in response to which each of the other network elements is to analyse its data currently awaiting transmission to determine an amount of bandwidth required for transmission of the data, and to transmit to the one network element signalling being indicative of its required amount of bandwidth; and, at the one network element, receiving the said signalling from each of the other network elements. Following on from this, the method may further comprise analysing the data currently awaiting transmission from the one network element of the first wireless communications system to determine an amount of bandwidth required for transmission of the data. The method may then comprise comparing the amount of bandwidth required by each of the network elements with an amount of spectrum currently assigned to the first communications system to obtain a difference for each network element, and selecting the minimum difference. Furthermore, the method may comprise transmitting from the first wireless communications system to the second wireless communications system signalling indicating that a portion of spectrum corresponding in size to the minimum difference is either available for assignment from each network element of the first wireless communications system to the particular network element of the second wireless communications system, or requested to be assigned from the particular network element of the second wireless communications system to each network element of the first wireless communications system, in dependence on the polarity of the difference. In this way, the disruption as mentioned above may be minimised.

As mentioned above, the method of the first aspect may form part of a response to the first trigger type (described below). In this case, the method may comprise performing the group coordinated process in response to the receipt of signalling from the second wireless communications system serving as a trigger to request the assignment of a specified amount of spectrum from the first wireless communications system to the particular network element of the second wireless communications system.

As also mentioned above, the method of the first aspect may (additionally or alternatively) form part of the actions of the second trigger type. In this case, the method may comprise performing the group coordinated process periodically in order to trigger an instance of the spectrum assignment process. By "periodically" it may be meant that each instance of the group coordinated process is undertaken following the elapse of a time interval from the previous instance, the time interval being fixed or variable. I.e. the group coordinated process may be effected repeatedly from time to time, at particular moments in time.

As already mentioned, the first wireless communications system (which may be, for example, a metropolitan-area network) may be configured to operate using a TDD mode, and the method may comprise operating the first wireless communications systems to use a time-division-duplex mode. In this case, as TDD schemes generally require precise synchronisation in order to operate successfully, it is useful that any change of spectrum usage following the spectrum assignment process is linked to the synchronisation processes of the first wireless communications system. In one arrangement, the method may comprise performing an instance of the spectrum assignment process following the group coordinated process, and communicating the result of the spectrum assignment process to a synchronisation module of the first wireless communications system.

According to a second aspect, there is provided a method of controlling spectrum use in a second wireless communications system which is operable to take part in a spectrum assignment process, in which process one of a first wireless communications system and the second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the method comprising identifying a portion of spectrum which is either available for assignment from the particular network element of the second wireless communications system to the network elements of the first wireless communications system, or required to be assigned from the network elements of the first wireless communications system to the particular network element of the second wireless communications system, in the spectrum assignment process.

The method may comprise identifying a portion of spectrum which is either available for assignment from each of the network elements of the first wireless communications system to the particular network element of the second wireless communications system, or required to be assigned from the particular network element of the second wireless communications system to each of the network elements of the first wireless communications system.

The method may comprise analysing data currently awaiting transmission from the particular network element of the second wireless communications system to determine an amount of bandwidth required for transmission of the data, and may further comprise calculating a difference between an amount of spectrum currently assigned to the particular network element of the second wireless communications system and the amount of bandwidth required by the particular network element. Moreover, the method may further comprise transmitting from the second wireless communications system to the first wireless communications system signalling indicating that a portion of spectrum corresponding in size to the calculated difference is either available for assignment from the particular network element of the second wireless communications system to the first wireless communications system, or requested to be assigned from the first wireless communications system to the particular network element of the second wireless communications system, in dependence on the polarity of the difference.

As mentioned above, the method of the second aspect may form part of the actions of the first trigger type itself, or may form part of a response to the second trigger type.

In the case that the method forms part of a response to the second trigger type, the method may comprise performing the method in response to the receipt of signalling from the first wireless communications system serving as a trigger to request the assignment of a specified amount of spectrum from the particular network element of the second wireless communications system to the first wireless communications system.

In the case that the method forms part of the actions of the first trigger type, the method may comprise performing the method periodically in order to trigger an instance of the spectrum assignment process.

Transmitting signalling to the first wireless communications system may comprise transmitting signalling to a lead network element of the first wireless access communications system.

The method may comprise operating the second wireless communications system to use a frequency-division-duplex mode.

According to a third aspect, there is provided apparatus for controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the apparatus comprising coordination circuitry configured to perform a group coordinated process comprising coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process.

The coordination circuitry may be configured to coordinate the network elements of the first wireless communications system to identify a portion of spectrum which is available for assignment, in the spectrum assignment process, from the network elements of the first wireless communications system to the particular network element of the second wireless communications system.

The coordination circuitry may be configured to coordinating the network elements of the first wireless communications system to identify a portion of spectrum which is the minimum amount of spectrum available for assignment from the network elements of the first wireless communications system.

The coordination circuitry may be configured to analyse a traffic buffer load of each of the network elements of the first wireless communications system, to determine an amount of spectrum required by each of the network elements of the first wireless communications system in dependence on the respective traffic buffer load, to compare each required amount of spectrum for the respective network element with an amount of spectrum currently assigned to the first communications system to obtain a difference for each network element, and to select a minimum difference to identify the said minimum amount of spectrum.

The coordination circuitry may be configured to map the traffic buffer load of each of the network elements to the respective amount of spectrum using a look-up table.

The coordination circuitry may be configured to coordinate the network elements of the first wireless communications system to identify a portion of spectrum which is required to be assigned from the particular network element of the second wireless communications system to the network elements of the first wireless communications system.

The coordination circuitry may be configured to identify a portion of spectrum which is either available for assignment from each of the network elements of the first wireless communications system to the particular network element of the second wireless communications system, or required to be assigned from the particular network element of the second wireless communications system to each of the network elements of the first wireless communications system.

The coordination circuitry may be configured to operate one of the network elements of the first wireless communications system to coordinate other network elements of the first wireless communications system.

The coordination circuitry may be configured to transmit from the one network element of the first wireless communications system to the other network elements signalling which indicates the start of the group coordinated process, in response to which each of the other network elements is to analyse its data currently awaiting transmission to determine an amount of bandwidth required for transmission of the data, and to transmit to the one network element signalling being indicative of its required amount of bandwidth; and to receive the said signalling at the one network element from each of the other network elements.

The coordination circuitry may be configured to analyse the data currently awaiting transmission from the one network element of the first wireless communications system to determine an amount of bandwidth required for transmission of the data.

The coordination circuitry may be configured to compare the amount of bandwidth required by each of the network elements with an amount of spectrum currently assigned to the first communications system to obtain a difference for each network element, and to select the minimum difference.

The coordination circuitry may be configured to transmit from the first wireless communications system to the second wireless communications system signalling indicating that a portion of spectrum corresponding in size to the minimum difference is either available for assignment from each network element of the first wireless communications system to the particular network element of the second wireless communications system, or requested to be assigned from the particular network element of the second wireless communications system to each network element of the first wireless communications system, in dependence on the polarity of the difference.

The coordination circuitry may be configured to perform the group coordinated process in response to the receipt of signalling from the second wireless communications system serving as a trigger to request the assignment of a specified amount of spectrum from the first wireless communications system to the particular network element of the second wireless communications system.

The coordination circuitry may be configured to perform the group coordinated process periodically in order to trigger an instance of the spectrum assignment process.

The apparatus may comprise spectrum assignment circuitry configured to perform an instance of the spectrum assignment process following the group coordinated process, and to communicate the result of the spectrum assignment process to a synchronisation module of the first wireless communications system.

According to a fourth aspect, there is provided apparatus for controlling spectrum use in a second wireless communications system which is operable to take part in a spectrum assignment process, in which process one of a first wireless communications system and the second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the apparatus comprising identification circuitry configured to identify a portion of spectrum which is either available for assignment from the particular network element of the second wireless communications system to the network elements of the first wireless communications system, or required to be assigned from the network elements of the first wireless communications system to the particular network element of the second wireless communications system, in the spectrum assignment process.

The identification circuitry may be configured to identify a portion of spectrum which is either available for assignment from each of the network elements of the first wireless communications system to the particular network element of the second wireless communications system, or required to be assigned from the particular network element of the second wireless communications system to each of the network elements of the first wireless communications system.

The identification circuitry may be configured to analyse data currently awaiting transmission from the particular network element of the second wireless communications system to determine an amount of bandwidth required for transmission of the data.

The identification circuitry may be configured to calculate a difference between an amount of spectrum currently assigned to the particular network element of the second wireless communications system and the amount of bandwidth required by the particular network element.

The identification circuitry may be configured to transmit from the second wireless communications system to the first wireless communications system signalling indicating that a portion of spectrum corresponding in size to the calculated difference is either available for assignment from the particular network element of the second wireless communications system to the first wireless communications system, or requested to be assigned from the first wireless communications system to the particular network element of the second wireless communications system, in dependence on the polarity of the difference.

The identification circuitry may be configured to identify the portion of spectrum in response to the receipt of signalling from the first wireless communications system serving as a trigger to request the assignment of a specified amount of spectrum from the particular network element of the second wireless communications system to the first wireless communications system.

The identification circuitry may be configured to identify the portion of spectrum periodically in order to trigger an instance of the spectrum assignment process.

The identification circuitry may be configured to transmit signalling to a lead network element of the first wireless access communications system.

According to a fifth aspect, there is provided a method of controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band using a time-division-duplex arrangement, the second wireless communications system using a frequency-division-duplex arrangement, the method comprising performing a group coordinated process comprising coordinating the network elements of the first wireless communications system to identify a portion of spectrum which is available for assignment from the first wireless communications system to the particular network element of the second wireless communications system;

assigning the identified portion of spectrum from the first wireless communications system to the particular network element of the second wireless communications system in the spectrum assignment process;

transmitting to a synchronisation module of the first wireless communications system signalling being indicative of a spectrum configuration following the spectrum assignment process; and operating the first wireless communications system to switch to the said spectrum configuration in coordination with the activities of the synchronisation module.

According to a sixth aspect, there is provided apparatus for controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band using a time-division-duplex arrangement, the second wireless communications system using a frequency-division-duplex arrangement, the apparatus comprising coordination circuitry configured to perform a group coordinated process comprising coordinating the network elements of the first wireless communications system to identify a portion of spectrum which is available for assignment from the first wireless communications system to the particular network element of the second wireless communications system;

spectrum assignment circuitry configured to assign the identified portion of spectrum from the first wireless communications system to the particular network element of the second wireless communications system in the spectrum assignment process;

the spectrum assignment circuitry being configured further to transmit to a synchronisation module of the first wireless communications system signalling being indicative of a spectrum configuration following the spectrum assignment process; and control circuitry configured to operate the first wireless communications system to switch to the said spectrum configuration in coordination with the activities of the synchronisation module.

According to a seventh aspect, there is provided a computer program which, when run on a computer forming part of a network element or an external controlling element, causes the computer to perform the method of the first aspect, the second aspect or the fifth aspect.

According to an eighth aspect, there is provided a computer program which, when loaded into a computer forming part of a network element or an external controlling element, causes the computer to become the apparatus of the third aspect, the fourth aspect or the sixth aspect.

According to a ninth aspect, there is provided a computer program of the seventh aspect or the eighth aspect, carried by a carrier medium, which may be a recording medium and/or a transmission medium.

According to a tenth aspect, there is provided a computer program which, when run on a computer, causes the computer to perform a method of controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the method comprising performing a group coordinated process comprising coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process.

According to an eleventh aspect, there is provided a computer program for controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the computer program comprising coordination code configured to perform a group coordinated process comprising coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process.

Any circuitry may include one or more processors, memories and bus lines. One or more of the circuitries described may share circuitry elements.

The present invention includes one or more aspects, embodiments or features in isolation or in various combinations whether or not specifically stated (including claimed) in that combination or in isolation.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

Embodiments of the invention relate to methods for inter-mode spectrum assignment in hierarchical overlaid cellular networks.

It is assumed that each group of MA BSs allocated in a WA can be grouped as a cluster while one BS is considered as the leader for the cluster of BSs.

Two trigger types for the start of inter-mode spectrum assignment in hierarchical overlaid cellular networks are disclosed.

Figure 1:
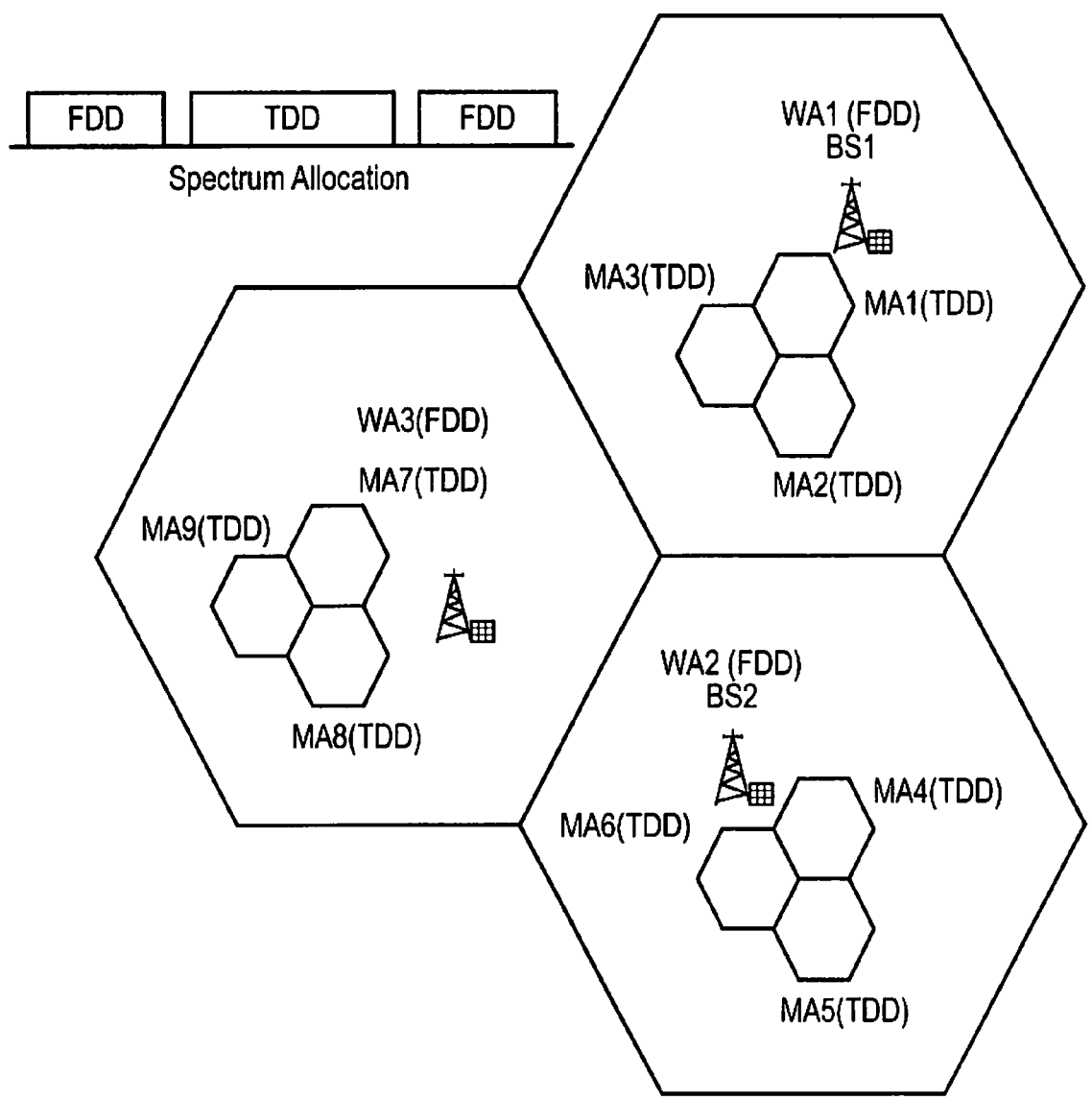
FIG. 1 shows a hierarchical overlaid cellular network.
Figure 2:
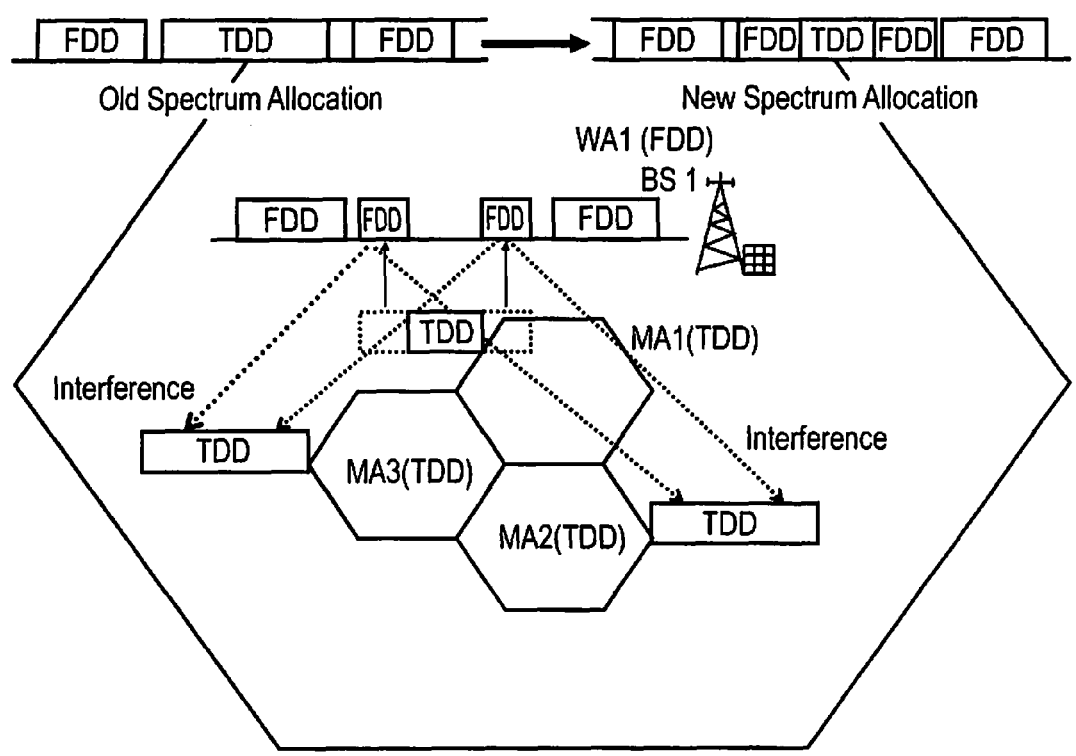
FIG. 2 illustrates a potential interference problem which might come about in the network of FIG. 1.
Figure 3:
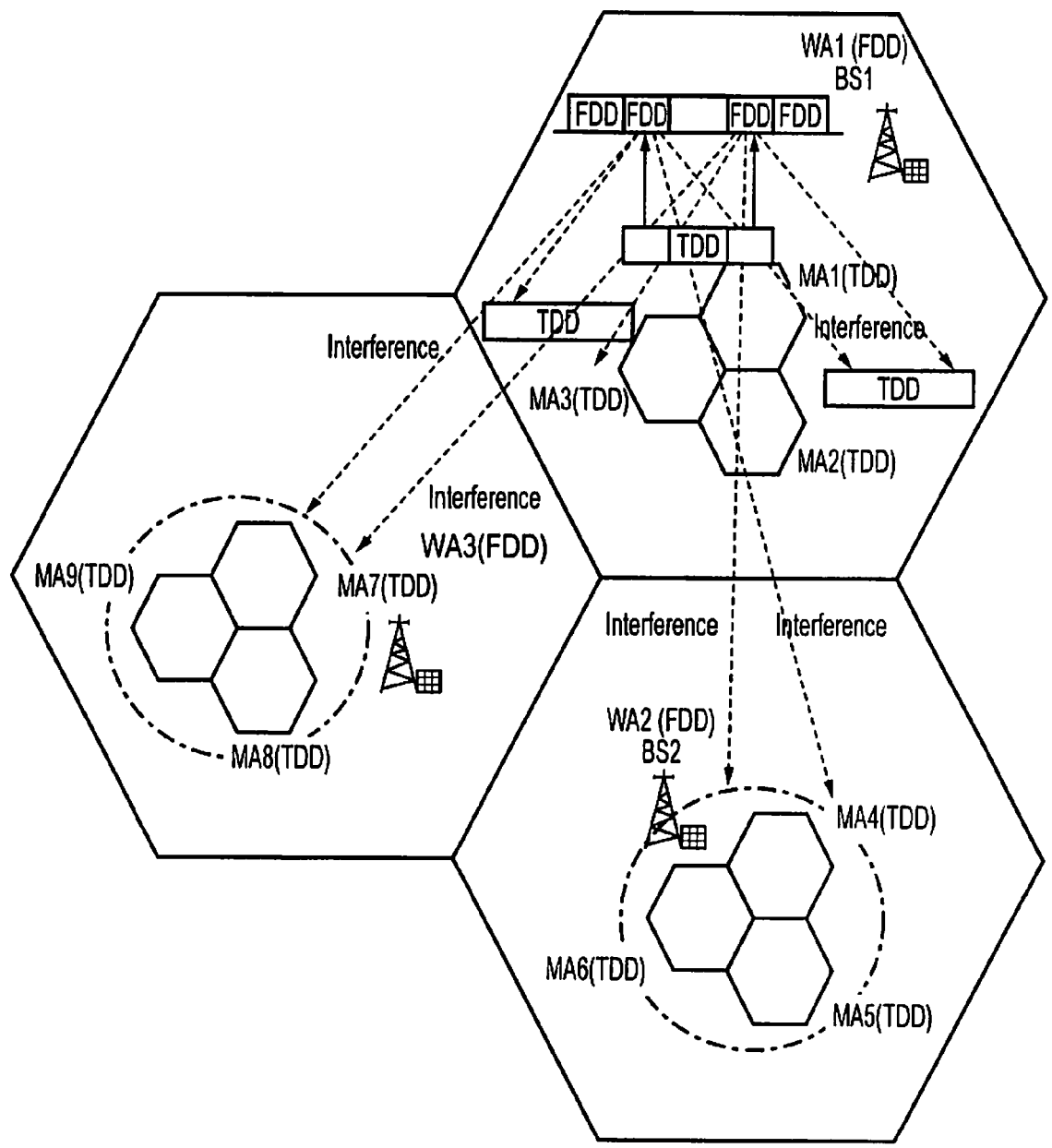
FIG. 3 illustrates a further potential interference problem which might result in the network of FIG. 1.
Figure 4:
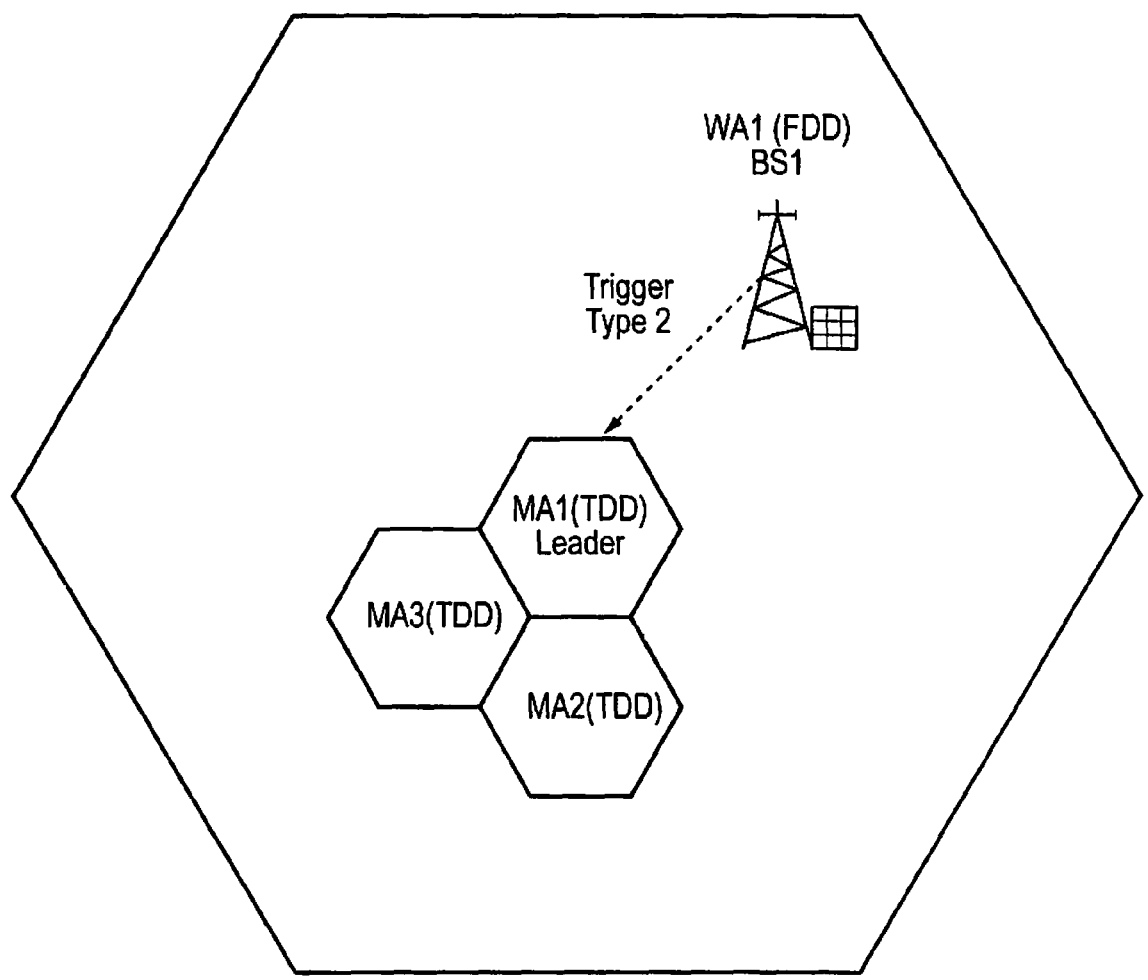
FIG. 4 illustrates signalling which takes place during an instance of a first trigger type for a spectrum assignment process.

According to the first trigger type, on a short-term basis, base station BS1 of cell WA1 measures the current data waiting in its buffer for transmission:

$$D = \sum_{k=1}^{K} d_k \quad (1)$$

where $d_k$ is the amount of data currently residing in the k-th buffer. If the current amount of data D is above a specific threshold, the base station BS1 of cell WA1 measures the extra traffic load and maps it to an extra sub-chunk of spectrum it requires for delivering the data safely. The base station BS1 of cell WA1 sends a signal of the first trigger type asking the leader of the MA base stations, cell MA1, to receive that specific amount of spectrum from the MAN, as shown in FIG. 4, without specifying where in the radio spectrum band the required chunk of spectrum is.

Figure 5:
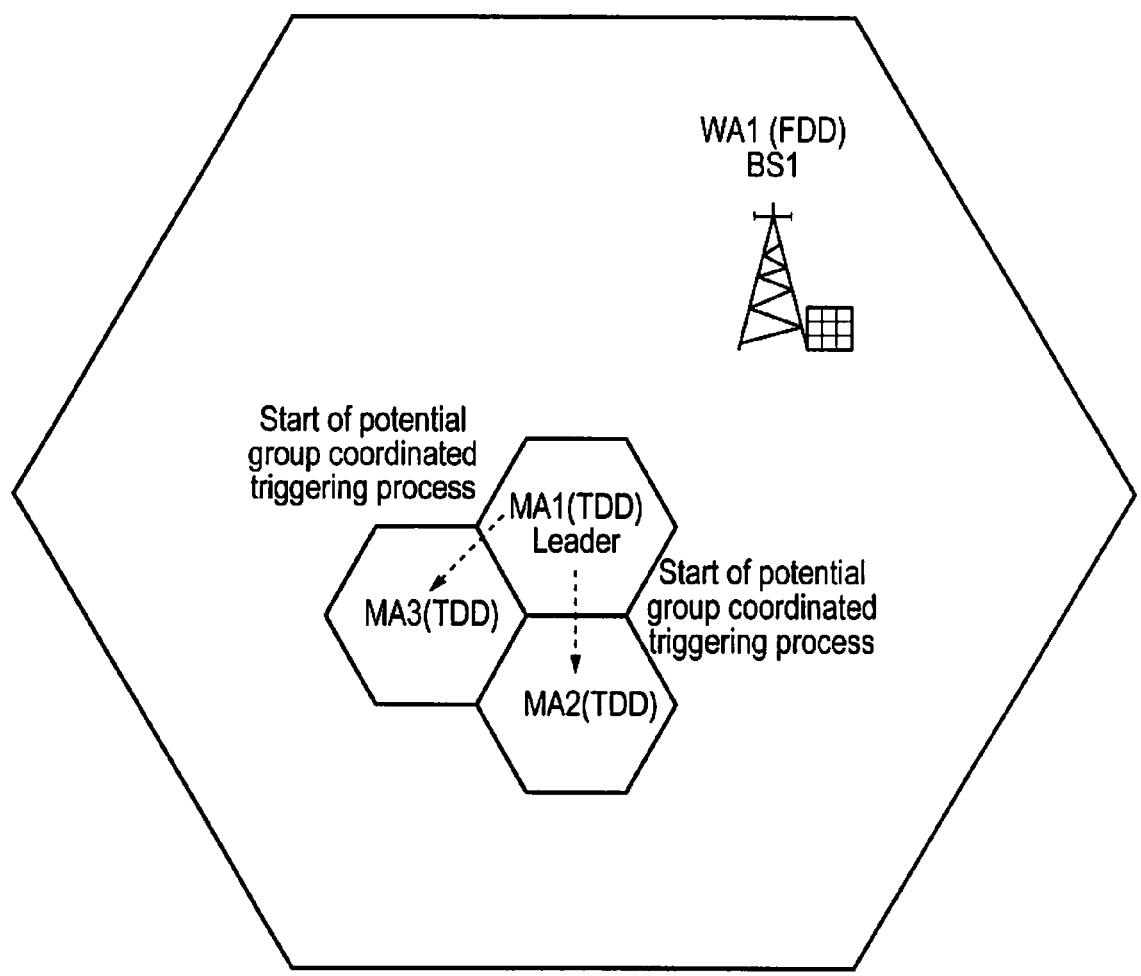
FIG. 5 illustrates signalling which takes place during an instance of a second trigger type for a spectrum assignment process.
Figure 6:
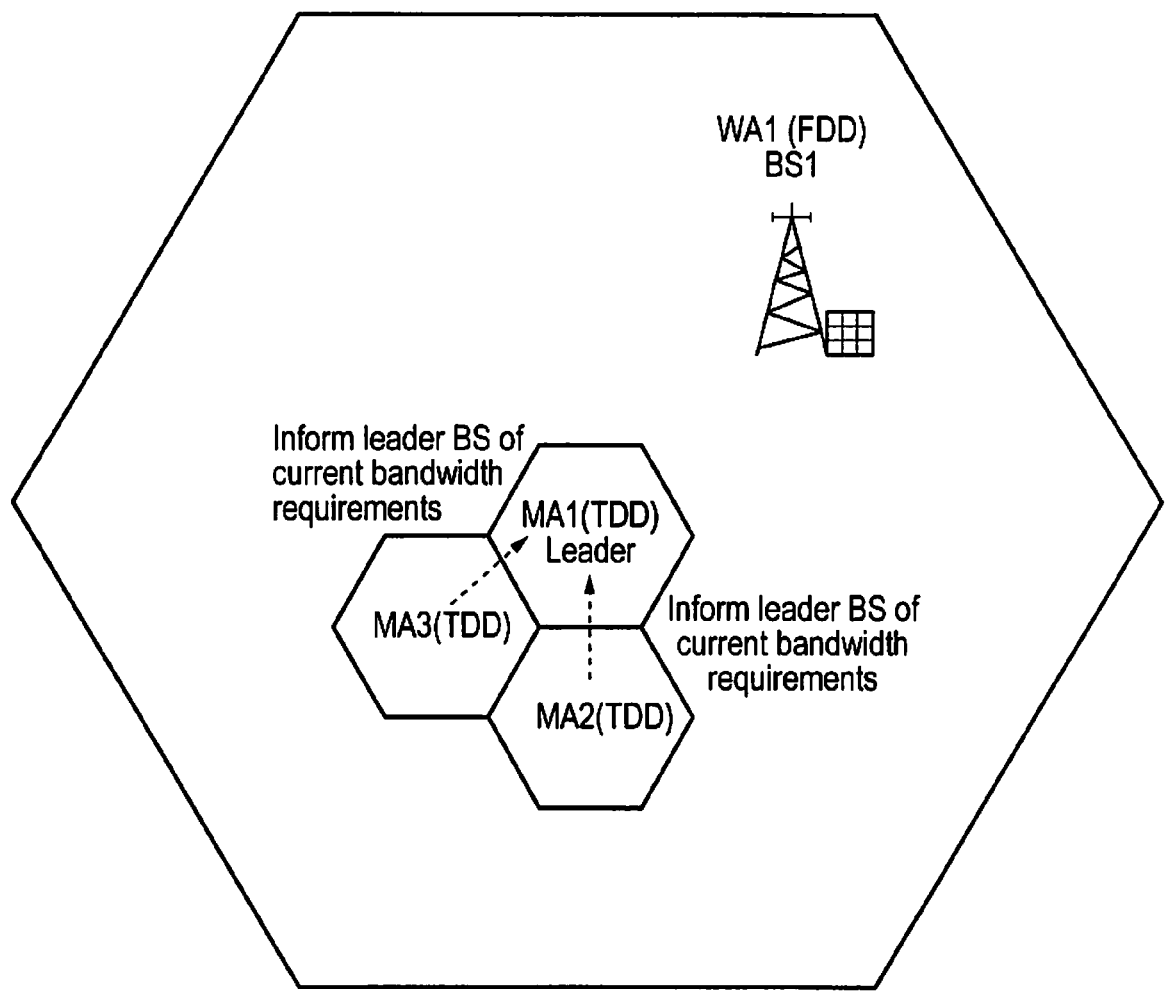
FIG. 6 illustrates further signalling which takes place during the instance of the second trigger type for a spectrum assignment process.

According to the second trigger type, which is a group coordinated triggering process, on a short term and periodic basis, the leader cell MA1 first informs the other MA base stations of the start of the group coordinated triggering process, as shown in FIG. 5. Each base station of the MAN measures the current data waiting for the transmission:

$$D_n = \sum_{k=1}^{K} d_{kn}, \quad n = 1 \ldots N \quad (2)$$

where $d_{kn}$ is the amount of data currently residing in the k-th buffer of the n-th base station in the MAN. Each base station maps the data waiting for the transmission to amount of required spectrum $B_n$ using a look-up table (in doing the mapping, the current radio channel may also be considered by the base station). Then all the involved base stations transfer the estimated requested spectrum to the leader base station MA1, as shown in FIG. 6. Assuming that the total bandwidth currently assigned to the MA cells is W, the leader BS then determines $$BW = \min(W - B_n), n = 1 \ldots N \quad (3)$$

Figure 7:
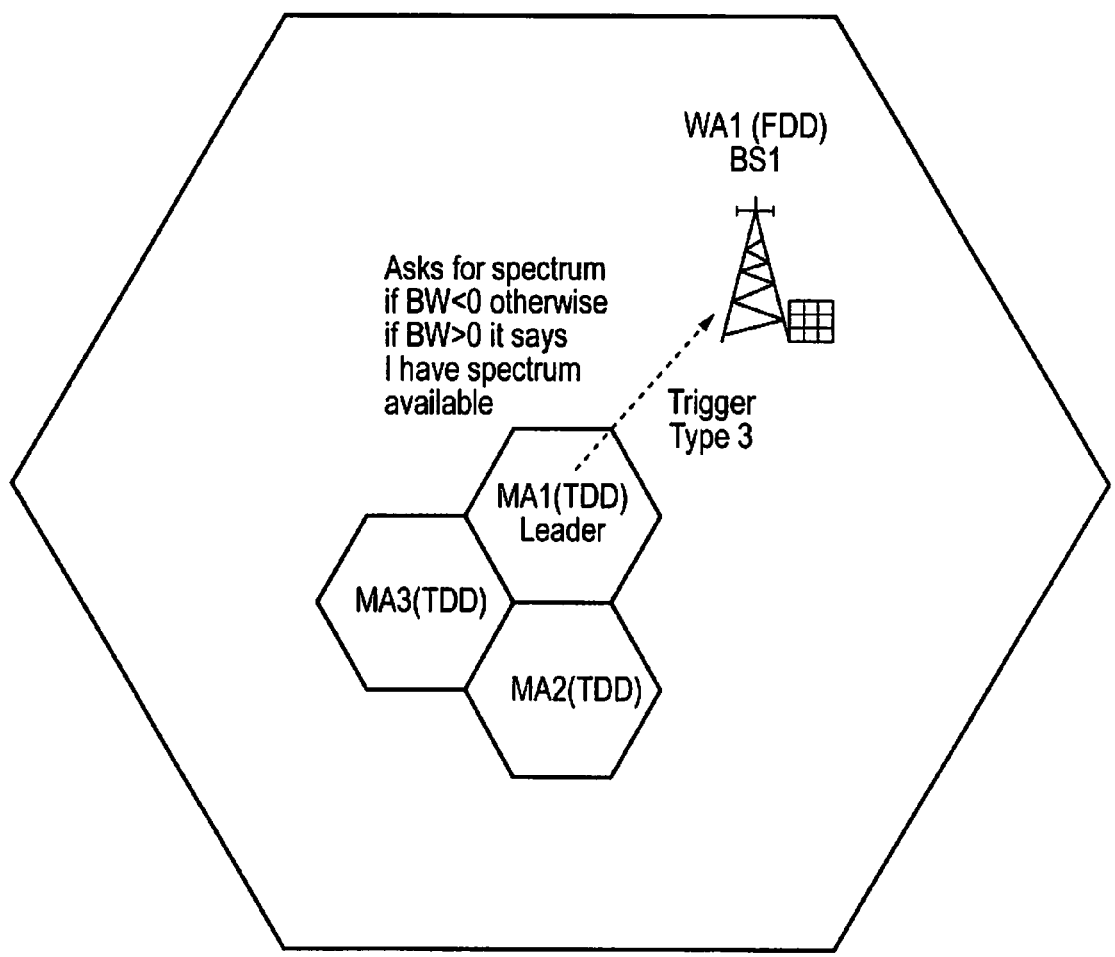
FIG. 7 illustrates yet further signalling which takes place during the instance of the second trigger type for a spectrum assignment process.

If BW<0, the leader base station MA1 sends a signal to the base station BS1 of the WAN (i.e. the closest WAN base station) including a request for spectrum, as shown in FIG. 7. Otherwise, if BW>0, the leader base station MA1 sends a signal to the base station BS1 of the WAN informing the base station BS1 of the availability of spectrum, as shown in FIG. 7.

Response to the respective two trigger types for the start of inter-mode spectrum assignment in hierarchical overlaid cellular networks will now be disclosed.

Figure 8:
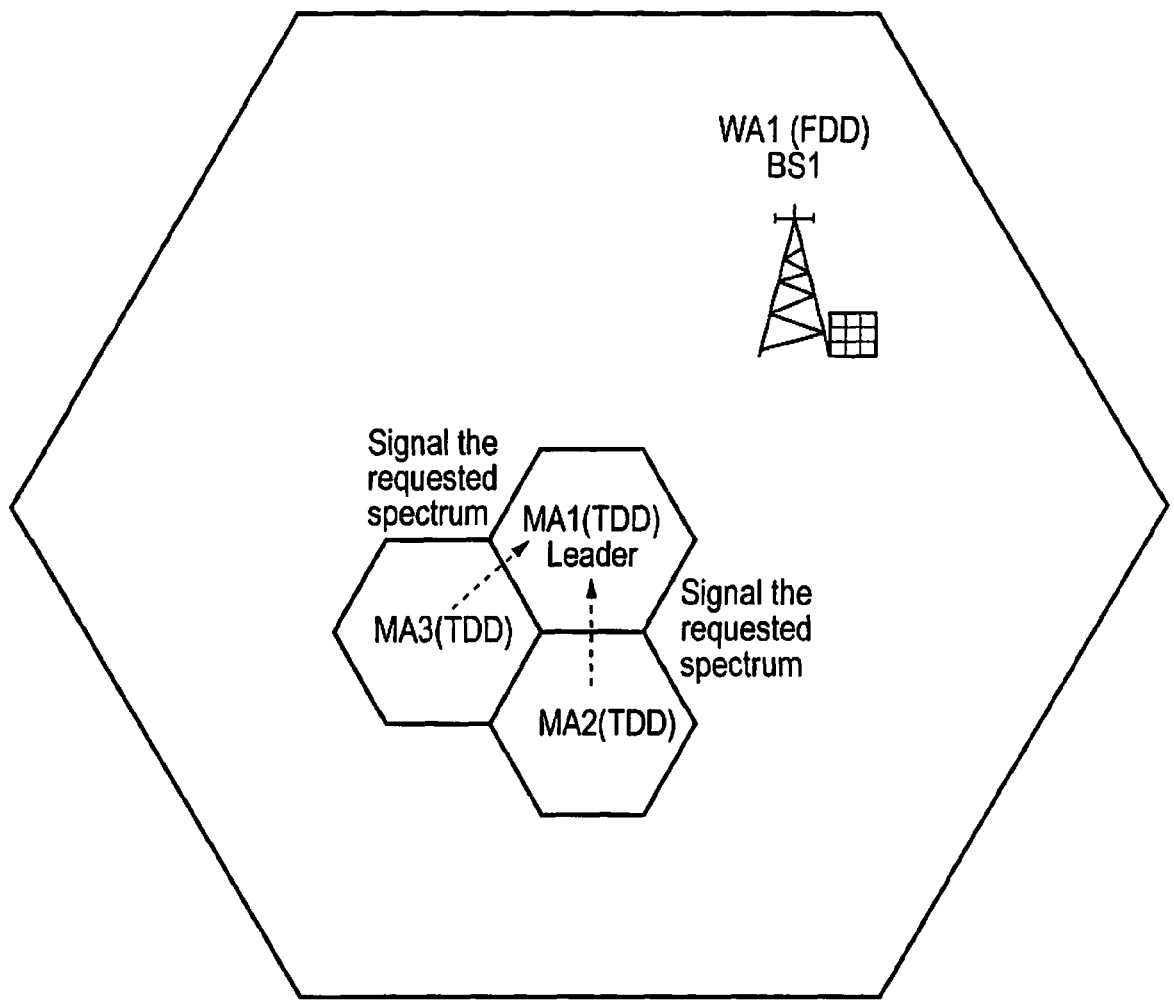
FIG. 8 illustrates signalling which takes placed during a short-term spectrum assignment process undertaken in response to the first trigger type.

According to the response to the first trigger type, on a short-term and periodic basis, the leader cell MA1 first informs the other MA base stations of the start of the group coordinated response process. Each MA base station measures the current data waiting for transmission:

$$D_n = \sum_{k=1}^{K} d_{kn}, \quad n = 1 \ldots N \quad (4)$$

where $d_{kn}$ is the amount of data currently residing in the k-th buffer of the n-th base station in the MAN. Each base station maps the data waiting for the transmission to amount of spectrum they can release $B_n$ using a look-up table (in doing the mapping, the current radio channel may also be considered by the base station). Then all the involved base stations transfer the estimated requested spectrum to the leader base station MA1, as shown in FIG. 8. Assuming that the total bandwidth currently assigned to the MA cells is W, the leader BS then determines $$BW = \min(W - B_n), n = 1 \ldots N \quad (5)$$

Figure 9:
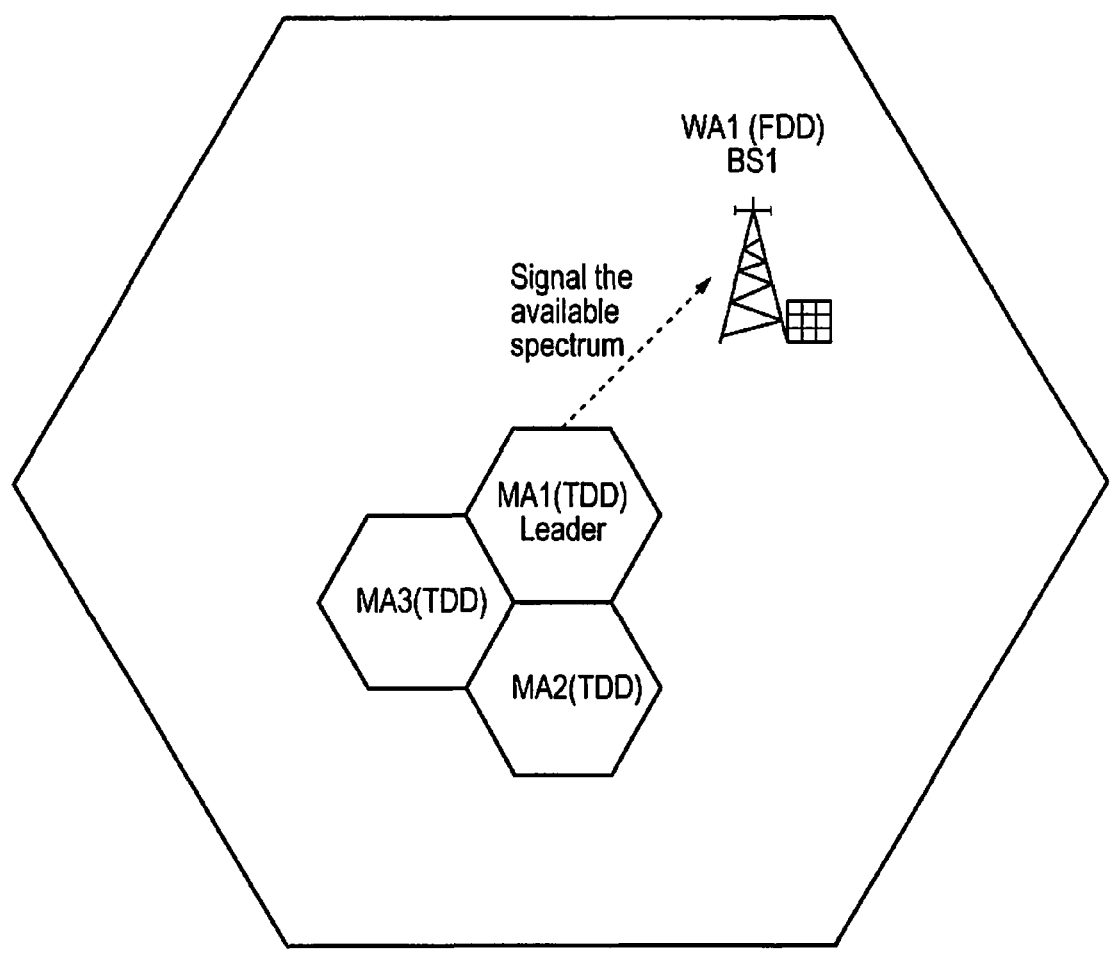
FIG. 9 illustrates further signalling which takes placed during the short-term spectrum assignment process undertaken in response to the first trigger type.

If BW>0, the leader base station MA1 informs the WA base station BS1 of the available bandwidth, as shown in FIG. 9.

Figure 10:
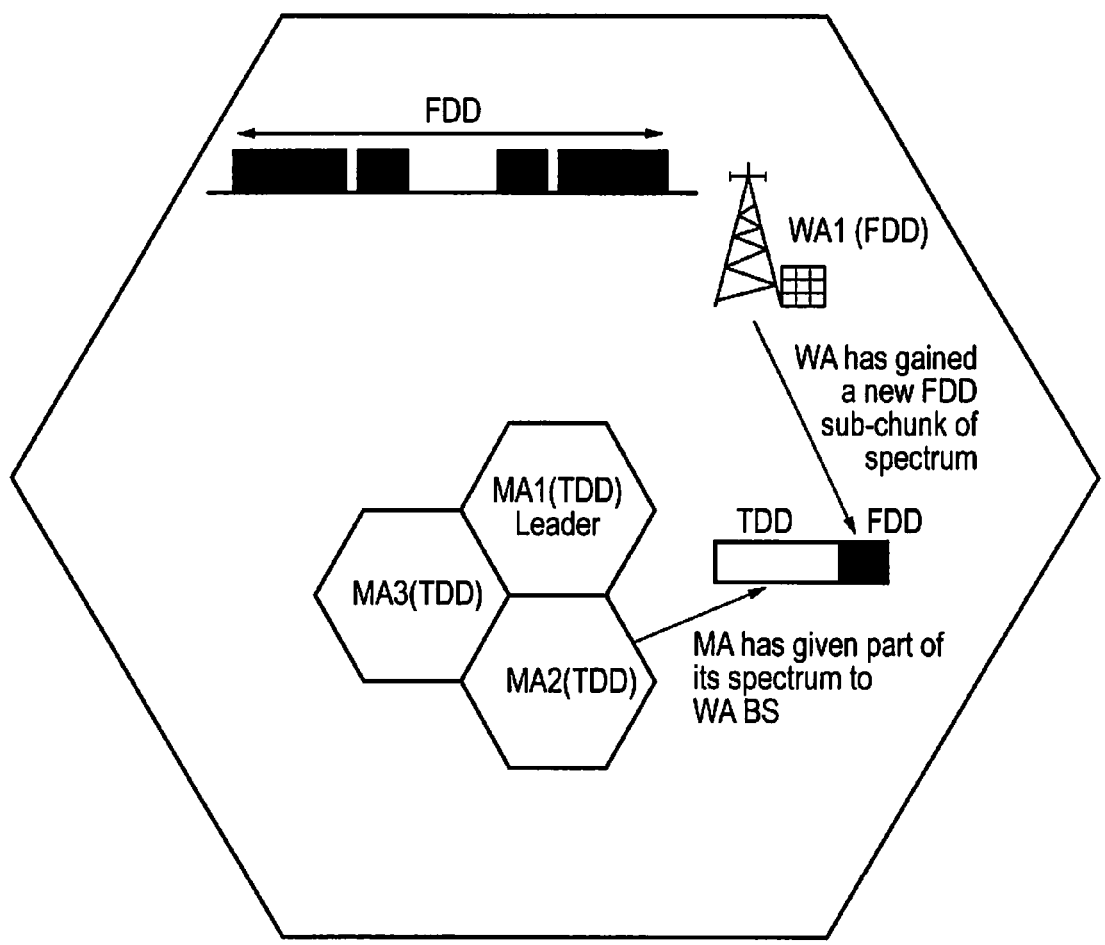
FIG. 10 illustrates a spectrum configuration obtained as a result of the short-term spectrum assignment process undertaken in response to the first trigger type.

The two systems adopt the new spectrum, as shown in FIG. 10, and the spectrum assignment process is completed. The spectrum diagram to the right-hand side of FIG. 10 includes a darkened portion representing a portion of spectrum being assigned from the MA cells MA1-3 to the WA cell WA1. The portion will no longer be under a TDD operation and will be operated under FDD, being one of the many sub-chunks shown to be belonging to the WA network.

According to the response to the second trigger type, the WA base station BS1 first receives the request for spectrum or availability of spectrum from the leader of MA, cell MA1.

The WA base station BS1 measures the current data waiting for transmission:

$$D = \sum_{k=1}^{K} d_k, \quad n = 1 \ldots N \quad (6)$$

where $d_k$ is the amount of data currently residing in the k-th buffer of the WA base station BS1. The WA base station BS1 maps the data waiting for the transmission to an amount of spectrum B required to transmit the data, using a look-up table (in doing the mapping current radio channel may also be considered by BS). Assuming that the total bandwidth currently assigned to the WA cells is W, the WA BS then determines $$BW = (W - B_n) \quad (7)$$

Figure 11:
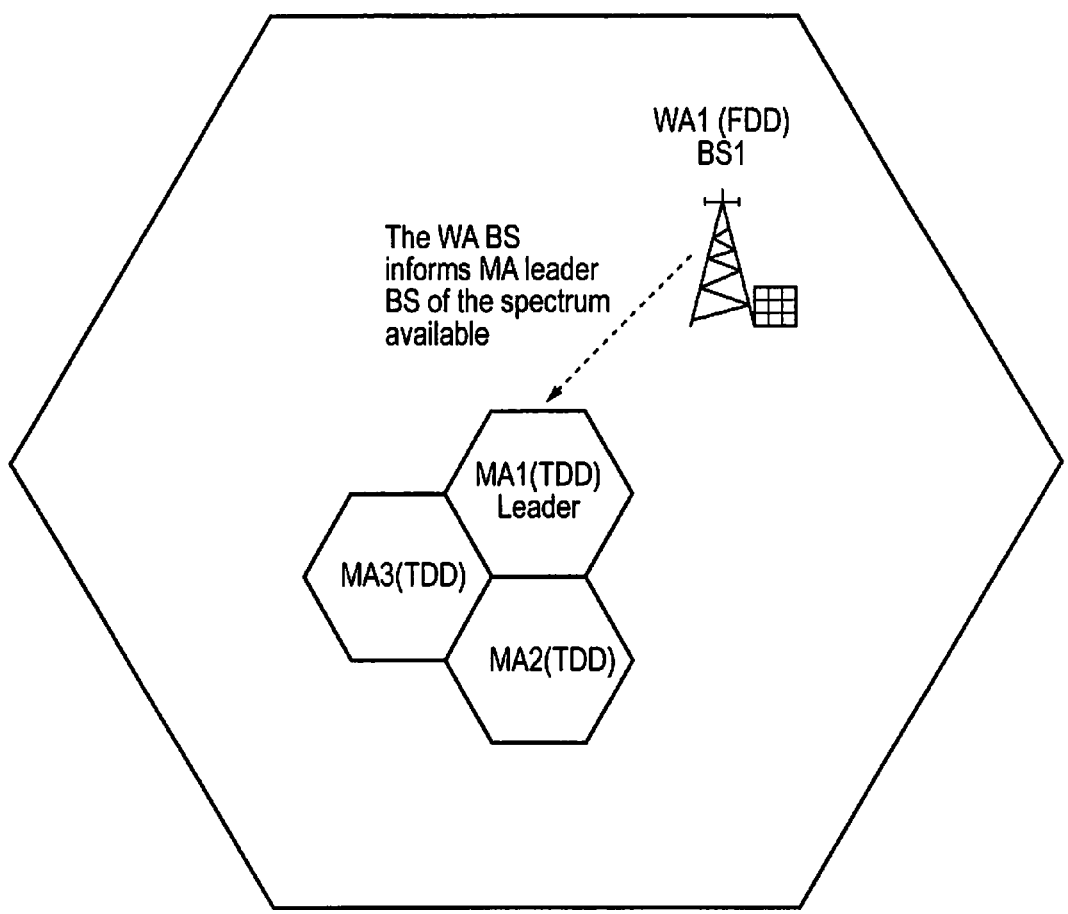
FIG. 11 illustrates signalling which takes placed during a short-term spectrum assignment process undertaken in response to the second trigger type.

If BW>0 and the leader base station of the MAN, cell MA1, has requested spectrum, the WA base station BS1 informs the MA leader MA1 of the amount of available spectrum, as shown in FIG. 11.

Figure 12:
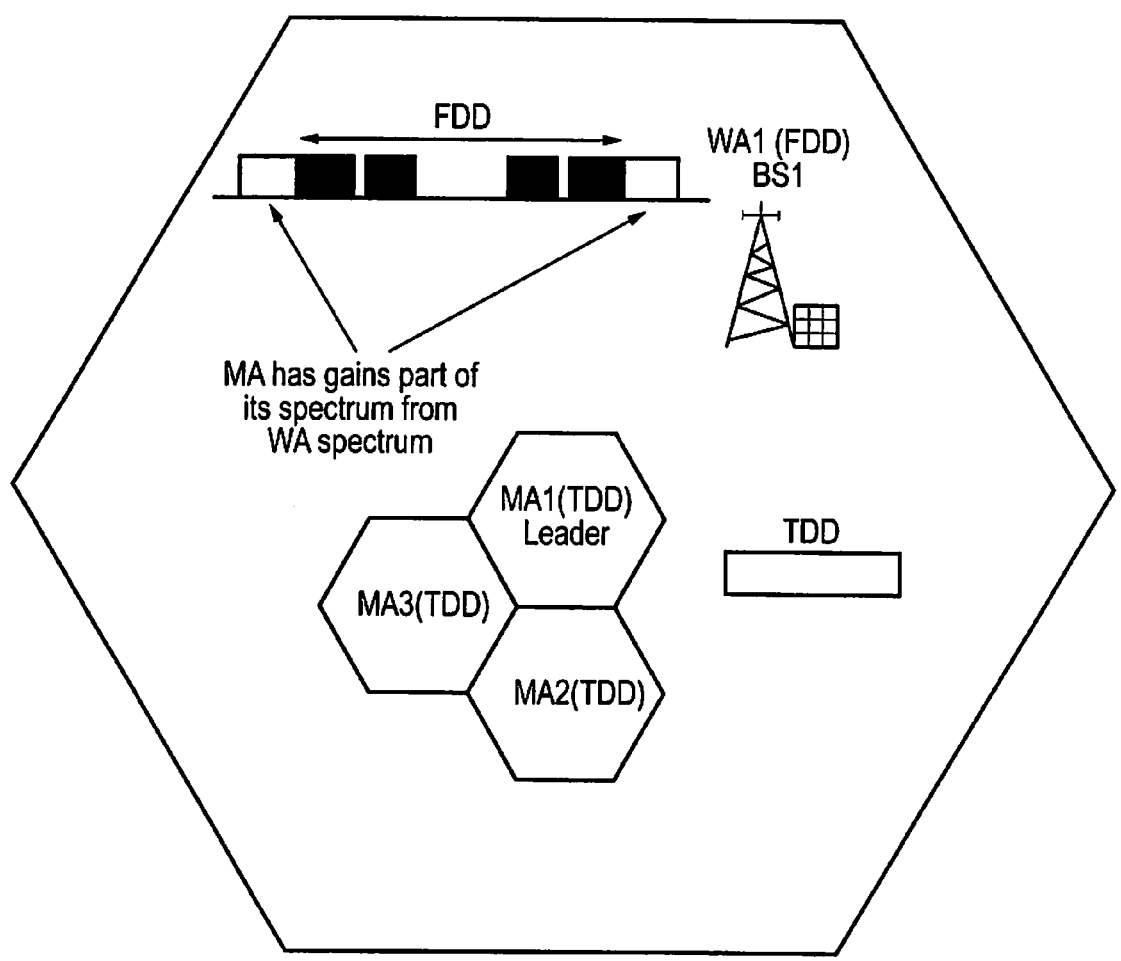
FIG. 12 illustrates a spectrum configuration obtained as a result of the short-term spectrum assignment process undertaken in response to the second trigger type.

The process is then completed if the MA leader cell MA1 is happy with the amount of spectrum to be allowed, and both the MAN and WAN switch to the new spectrum configuration, as shown in FIG. 12.

Figure 13:
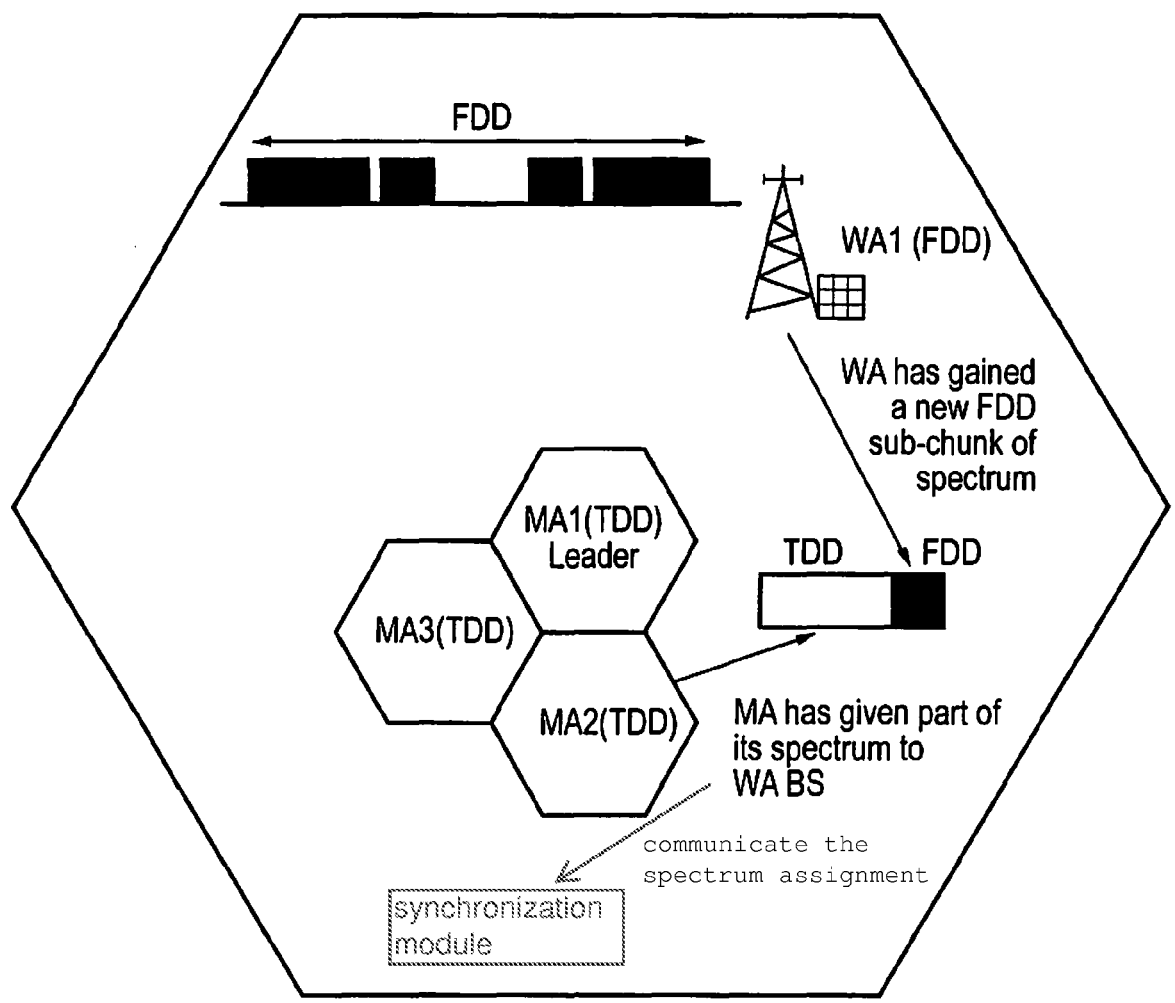
FIG. 13 illustrates an alternative spectrum configuration obtained as a result of the short-term spectrum assignment process undertaken in response to the second trigger type.

On the other hand, if BW<0 and the MA leader cell MA1 has signalled the availability of spectrum, the WA base station BS1 informs the MA leader cell MA1 that it is happy with the available spectrum for assignment, and the process is completed, as shown in FIG. 13.

Figure 14A:
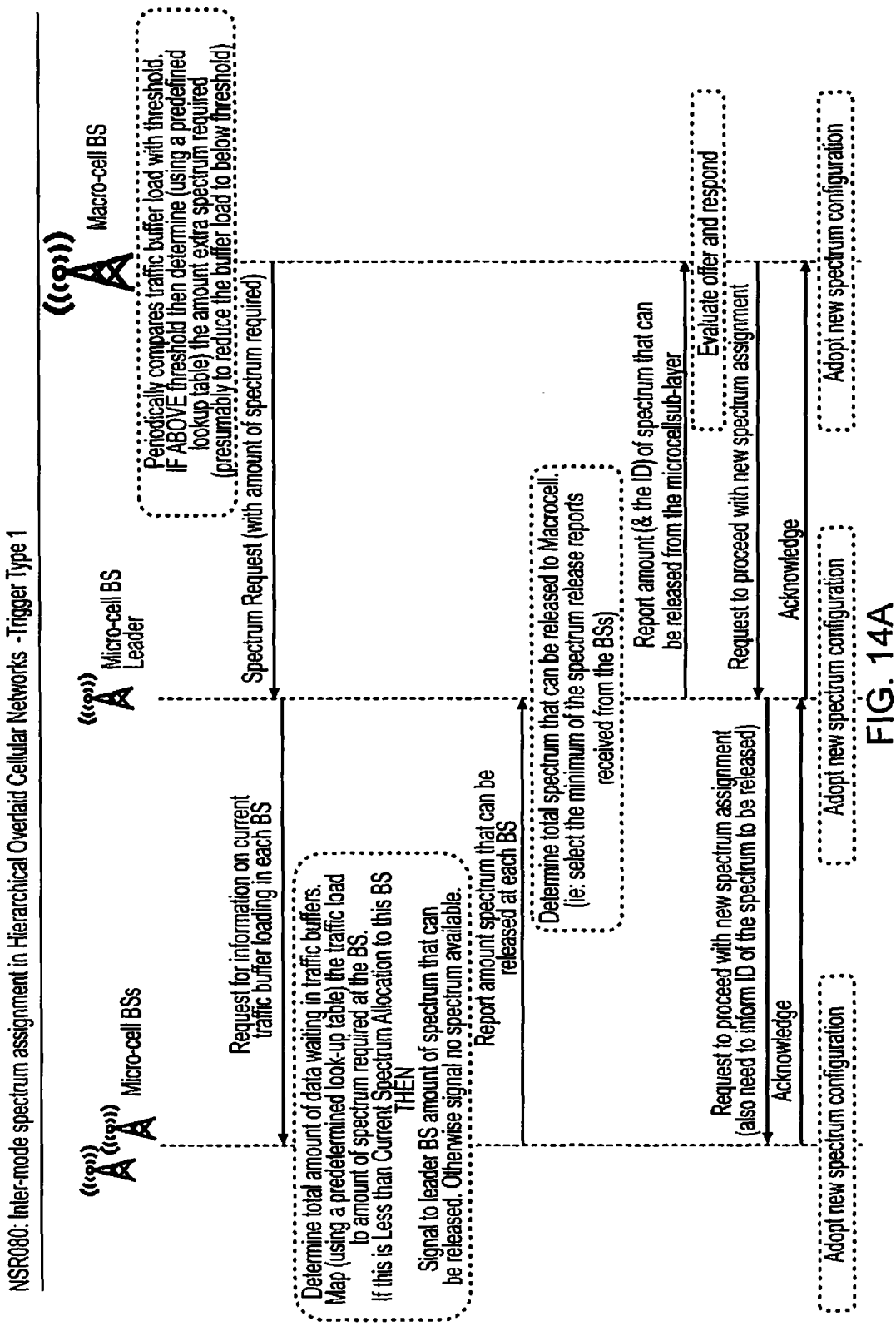
FIG. 14A shows a protocol for an instance of the first trigger type and the response to the first trigger type.

FIG. 14A shows a protocol for an instance of the first trigger type and the response to the first trigger type. As can be seen, a macro-cell BS (e.g. WA base station BS1) periodically compares traffic buffer load with a threshold. The threshold may be set in dependence on the quality of service and the traffic type. It is preferable that the buffer load does not exceed a specific amount, otherwise there may be a buffer overflow and degradation of the QoS. If the traffic buffer load is above the threshold, the macro-cell BS determines (using a predefined look-up table) an amount of extra spectrum required in order to reduce the buffer load to a level which is at or below the threshold. The traffic buffer load may be used to map the traffic data pipe to the spectrum pipe, to ensure that the process of dynamic spectrum allocation is linked to the process of changing traffic and data pipe plus the interference. The macro-cell BS transmits a spectrum request to a micro-cell BS leader (e.g. MA cell MA1) specifying an amount of spectrum required. The micro-cell BS leader transmits a request for information on current traffic buffer load to each other micro-cell BS. Each micro-cell BS (e.g. MA cells WA2, WA3) determines the total amount of data waiting in its traffic buffers, and maps (using a predetermined look-up table) the traffic load to an amount of spectrum required by the micro-cell BS. If this is less than the current spectrum allocation to this micro-cell BS, the BS signals to the micro-cell BS leader the amount of spectrum that can be released. Otherwise, the micro-cell BS signals that no spectrum is available, and the process ends. The micro-cell BS leader determines the total amount of spectrum (and its ID) that can be released to the macro-cell BS by selecting the minimum of the spectrum release reports received from the micro-cell BSs (including its own spectrum release report). The micro-cell BS leader reports the amount and ID of the spectrum that can be released from the micro-cell sub-layer to the macro-cell BS. The macro-cell BS evaluates the offer (to ensure that the final spectrum configuration will not be harmful to the macro-cell BS in terms of inflicted interference) and, if the offer is acceptable, responds by sending a request to proceed with the new spectrum assignment to the micro-cell BS leader. (The process is terminated if the offer is not acceptable.) The micro-cell BS leader transmits requests to proceed with the new spectrum assignment (and the ID of the spectrum to be released) to the micro-cell BSs. The micro-cell BSs send an acknowledgement to the micro-cell BS leader, which sends an acknowledgement to the macro-cell BS. The macro-cell BS, the micro-cell BS leader and the micro-cell BSs then adopt the new spectrum configuration.

Figure 14B:
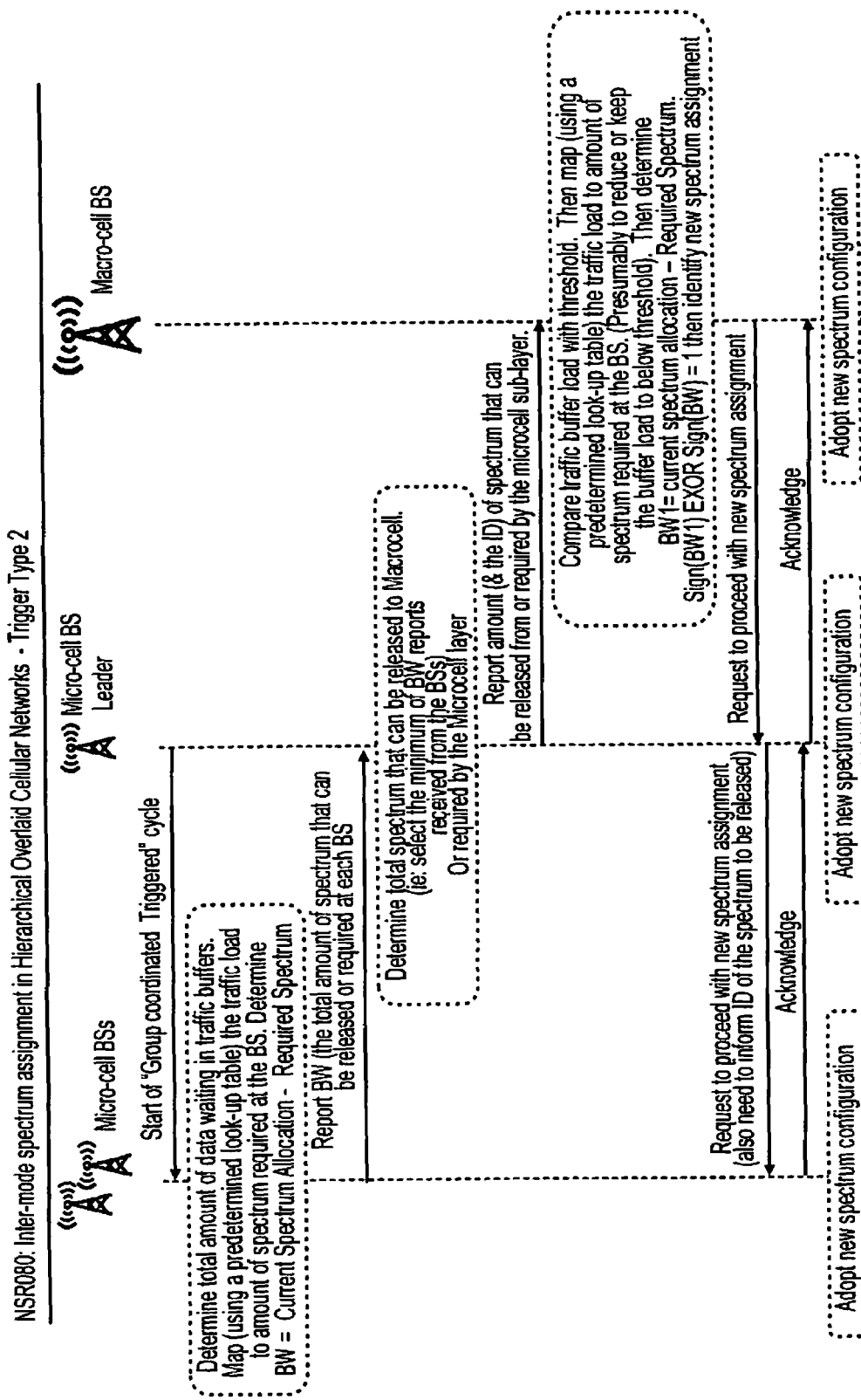
FIG. 14B shows a protocol for an instance of the second trigger type and the response to the second trigger type.

FIG. 14B shows a protocol for an instance of the second trigger type and the response to the second trigger type. The micro-cell BS leader signals the start of the group coordinated triggering process to the micro-cell BSs. Each micro-cell BS then determines the total amount of data waiting in its traffic buffers and maps (using a predetermined look-up table) the traffic load to an amount of spectrum required by the micro-cell BS. Each micro-cell BS then determines BW=current spectrum allocation—required spectrum, and reports BW (the total amount of spectrum that can be released from—or which is required by—each BS) to the micro-cell BS leader. The micro-cell BS leader determines the total amount of spectrum that can be released to the macro-cell BS (or the amount required by the micro-cell layer) by selecting the minimum of the BW reports received from the micro-cell BSs. (In the case that more than one micro-cell BS requires spectrum from the macro-cell BS, the method may comprise selecting the maximum BW report, rather than the minimum, to ensure that the micro-cell BSs have enough bandwidth. Furthermore, the method may comprise starting with the maximum BW report and going for less if the negotiations are not successful.) The micro-cell BS leader reports to the macro-cell BS the amount and the ID of the spectrum that can be released from (or the amount that it is required by) the micro-cell sub-layer. The macro-cell BS compares its traffic buffer load with a threshold, and maps (using a predetermined look-up table) the traffic buffer load to an amount of extra spectrum required by the macro-cell BS in order to reduce the buffer load to a level which is at or below the threshold. The macro-cell BS then determines BW1=current spectrum allocation—required spectrum. If one but not both of the micro-cell sub-layer and the macro-cell BS requires spectrum (for example if sign (BW1) EXOR sign(BW)=1), then a new spectrum assignment is identified, for example in the manner described above. The macro-cell BS sends a request to proceed with the new spectrum assignment to the micro-cell BS leader. The micro-cell BS leader sends requests to proceed with the new spectrum assignment (and the ID of the spectrum to be released) to the micro-cell BSs. The micro-cell BSs send an acknowledgement to the micro-cell BS leader, which sends an acknowledgement to the macro-cell BS. The macro-cell BS, the micro-cell BS leader and the micro-cell BSs then adopt the new spectrum configuration.

The following disclosure relates to a performance evaluation and simulation results. For the purposes of the simulation, it is assumed that three MA BSs are present within a WA cell. It is assumed that the MA BSs are operating in TDD mode while the WA BSs are operating in FDD mode. The bit error rate (BER) requirements selected for simulations is $10^{-3}$, and it is assumed that a Reed-Muller channel code RM(1,m) is used. Adaptive channel coding rates for a data packet and radio node have been considered to enable the radio nodes to adjust their transmission rates and consequently the target SIR values. The presented SIR results in Table 1 can be employed to obtain the equivalent throughput results.

TABLE 1

Code Rates of Reed-Muller Code RM (1, m) and Corresponding SIR Requirements for Target BER

| m | Code Rate | SIR (dB) |
|---|---|---|
| 2 | 0.75 | 6 |
| 3 | 0.5 | 5.15 |
| 4 | 0.3125 | 4.6 |
| 5 | 0.1875 | 4.1 |
| 6 | 0.1094 | 3.75 |
| 7 | 0.0625 | 3.45 |
| 8 | 0.0352 | 3.2 |
| 9 | 0.0195 | 3.1 |
| 10 | 0.0107 | 2.8 |

Figure 15A:
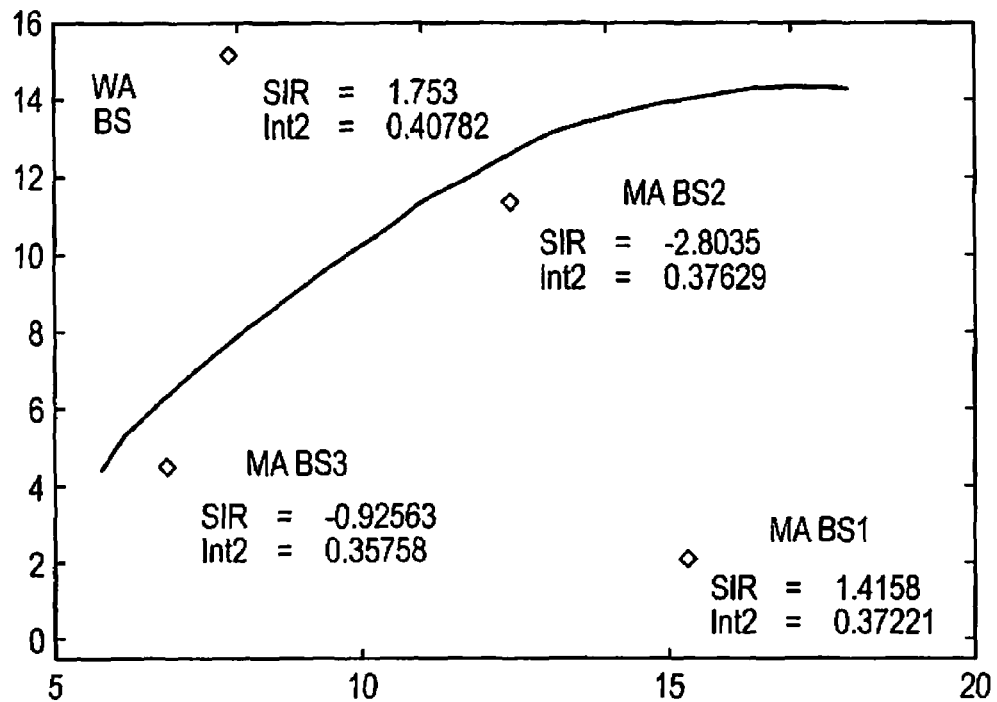
FIG. 15A shows the result of a simulation of the impact of the short-term spectrum assignment process on a level of interference, immediately before the release of spectrum.
Figure 15B:
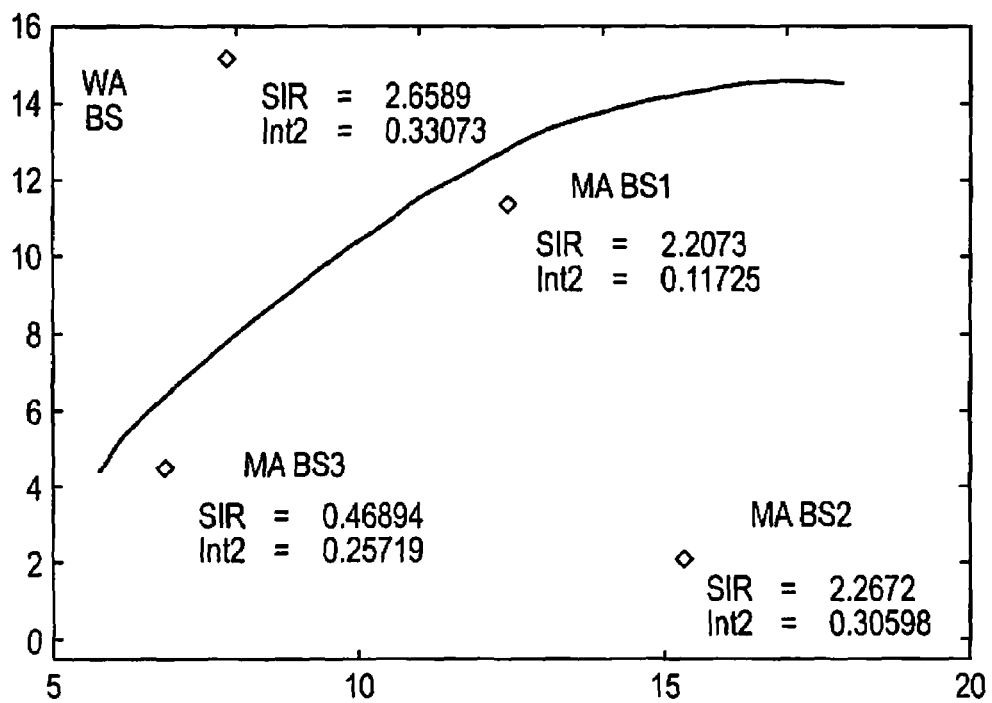
FIG. 15B shows the result of a simulation of the impact of the short-term spectrum assignment process on a level of interference, after completion of the short-term spectrum assignment process.

FIG. 15A shows the result of a simulation of the impact of the short-term spectrum assignment process on a level of interference, immediately before the release of spectrum, while FIG. 15B shows the result of a simulation of the impact of the short-term spectrum assignment process on a level of interference, after completion of the short-term spectrum assignment process. It can be seen that, after a successful negotiation, with part of the spectrum having been allocated from MA to the WA BS of interest, the interference reduced and the SIR improved.

Figure 16:
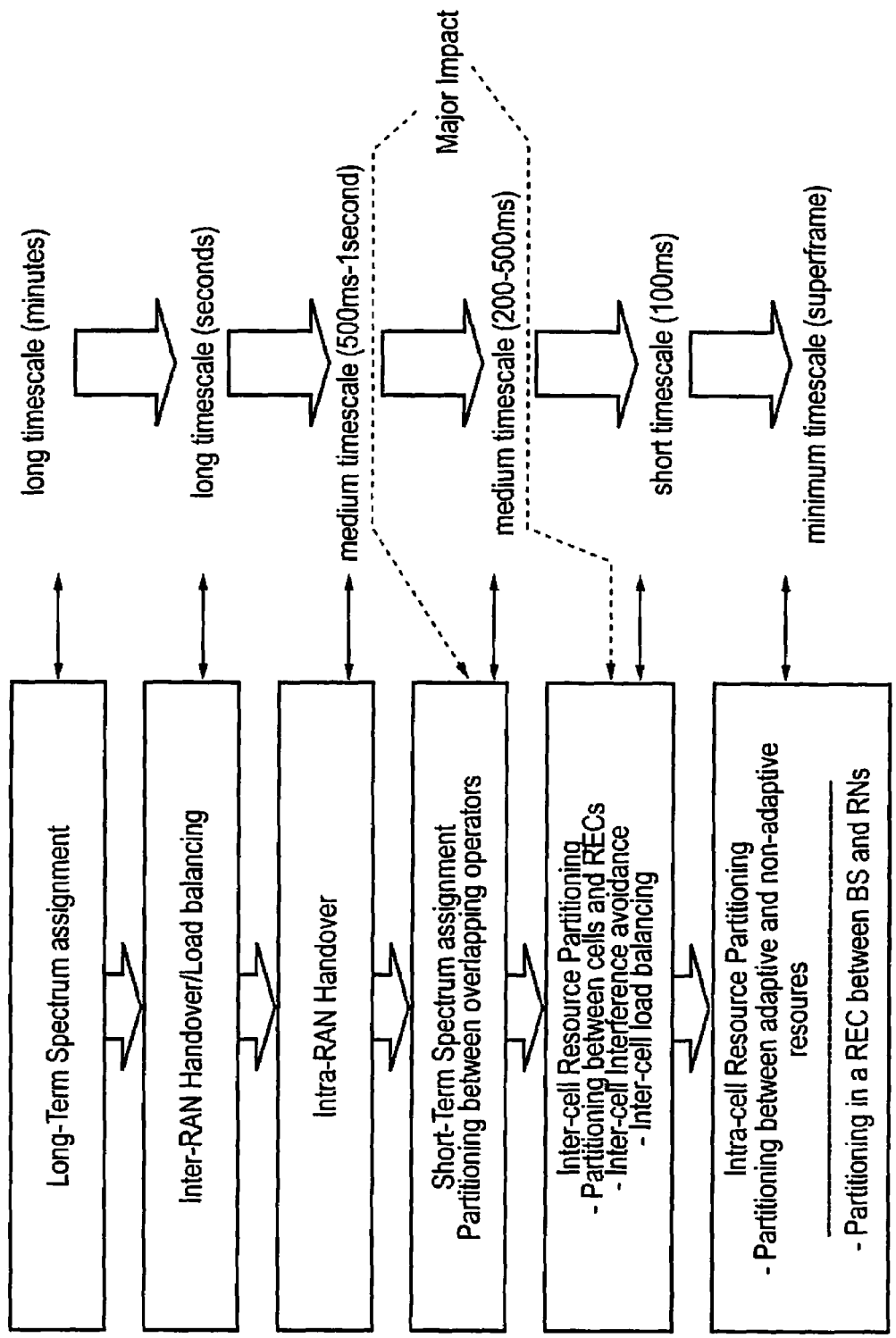
FIG. 16 shows the impact of the invention on the stages of spectrum assignment.

FIG. 16 shows the impact of the invention on the stages of spectrum assignment, the major impact being on short-term spectrum assignment and on inter-cell resource partitioning.

It will be appreciated that the aforementioned circuitry may have other functions in addition to the mentioned functions, and that these functions may be performed by the same circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention may extend to the following statements:

Statement 1. A method of controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the method comprising performing a group coordinated process comprising coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process.

Statement 2. The method of statement 1 comprising, in the group coordinated process, coordinating the network elements of the first wireless communications system to identify a portion of spectrum which is available for assignment, in the spectrum assignment process, from the network elements of the first wireless communications system to the particular network element of the second wireless communications system.

Statement 3. The method of statement 2 wherein coordinating the network elements of the first wireless communications system to identify the portion of spectrum comprises identifying a portion of spectrum which is the minimum amount of spectrum available for assignment from the network elements of the first wireless communications system.

Statement 4. The method of statement 3 wherein identifying the portion of spectrum which is the minimum amount of spectrum available for assignment from the network elements of the first wireless communications system comprises analysing a traffic buffer load of each of the network elements of the first wireless communications system, determining an amount of spectrum required by each of the network elements of the first wireless communications system in dependence on the respective traffic buffer load, comparing each required amount of spectrum for the respective network element with an amount of spectrum currently assigned to the first communications system to obtain a difference for each network element, and selecting a minimum difference to identify the said minimum amount of spectrum.

Statement 5. The method of statement 4 wherein determining the amount of spectrum required by each of the network elements of the first wireless communications system in dependence on the respective traffic buffer load comprises mapping the traffic buffer load of each of the network elements to the respective amount of spectrum using a look-up table.

Statement 6. The method of statement 1 comprising, in the group coordinated process, coordinating the network elements of the first wireless communications system to identify a portion of spectrum which is required to be assigned from the particular network element of the second wireless communications system to the network elements of the first wireless communications system.

Statement 7. The method of any preceding statement wherein coordinating the network elements of the first wireless communications system comprises identifying a portion of spectrum which is either available for assignment from each of the network elements of the first wireless communications system to the particular network element of the second wireless communications system, or required to be assigned from the particular network element of the second wireless communications system to each of the network elements of the first wireless communications system.

Statement 8. The method of any preceding statement wherein coordinating the network elements of the first wireless communications system comprises operating one of the network elements of the first wireless communications system to coordinate other network elements of the first wireless communications system.

Statement 9. The method of statement 8 comprising
transmitting from the one network element of the first wireless communications system to the other network elements signalling which indicates the start of the group coordinated process, in response to which each of the other network elements is to analyse its data currently awaiting transmission to determine an amount of bandwidth required for transmission of the data, and to transmit to the one network element signalling being indicative of its required amount of bandwidth; and
at the one network element, receiving the said signalling from each of the other network elements.

Statement 10. The method of statement 9 comprising
analysing the data currently awaiting transmission from the one network element of the first wireless communications system to determine an amount of bandwidth required for transmission of the data.

Statement 11. The method of statement 10 comprising
comparing the amount of bandwidth required by each of the network elements with an amount of spectrum currently assigned to the first communications system to obtain a difference for each network element, and selecting the minimum difference.

Statement 12. The method of statement 11 comprising
transmitting from the first wireless communications system to the second wireless communications system signalling indicating that a portion of spectrum corresponding in size to the minimum difference is either available for assignment from each network element of the first wireless communications system to the particular network element of the second wireless communications system, or requested to be assigned from the particular network element of the second wireless communications system to each network element of the first wireless communications system, in dependence on the polarity of the difference.

Statement 13. The method of any of statements 8 to 12 wherein the one network element is a lead network element of the first wireless communications system.

Statement 14. The method of any preceding statement comprising performing the group coordinated process in response to the receipt of signalling from the second wireless communications system serving as a trigger to request the assignment of a specified amount of spectrum from the first wireless communications system to the particular network element of the second wireless communications system.

Statement 15. The method of any of statements 1 to 13 comprising performing the group coordinated process periodically in order to trigger an instance of the spectrum assignment process.

Statement 16. The method of any preceding statement comprising operating the first wireless communications systems to use a time-division-duplex mode.

Statement 17. The method of statement 16 comprising performing an instance of the spectrum assignment process following the group coordinated process, and communicating the result of the spectrum assignment process to a synchronisation module of the first wireless communications system.

Statement 18. A method of controlling spectrum use in a second wireless communications system which is operable to take part in a spectrum assignment process, in which process one of a first wireless communications system and the second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the method comprising
identifying a portion of spectrum which is either available for assignment from the particular network element of the second wireless communications system to the network elements of the first wireless communications system, or required to be assigned from the network elements of the first wireless communications system to the particular network element of the second wireless communications system, in the spectrum assignment process.

Statement 19. The method of statement 18 comprising identifying a portion of spectrum which is either available for assignment from each of the network elements of the first wireless communications system to the particular network element of the second wireless communications system, or required to be assigned from the particular network element of the second wireless communications system to each of the network elements of the first wireless communications system.

Statement 20. The method of statement 18 or 19 comprising analysing data currently awaiting transmission from the particular network element of the second wireless communications system to determine an amount of bandwidth required for transmission of the data.

Statement 21. The method of statement 20 comprising calculating a difference between an amount of spectrum currently assigned to the particular network element of the second wireless communications system and the amount of bandwidth required by the particular network element.

Statement 22. The method of statement 21 comprising transmitting from the second wireless communications system to the first wireless communications system signalling indicating that a portion of spectrum corresponding in size to the calculated difference is either available for assignment from the particular network element of the second wireless communications system to the first wireless communications system, or requested to be assigned from the first wireless communications system to the particular network element of the second wireless communications system, in dependence on the polarity of the difference.

Statement 23. The method of any of statements 18 to 22 comprising performing the method in response to the receipt of signalling from the first wireless communications system serving as a trigger to request the assignment of a specified amount of spectrum from the particular network element of the second wireless communications system to the first wireless communications system.

Statement 24. The method of statement 23 comprising performing the method periodically in order to trigger an instance of the spectrum assignment process.

Statement 25. The method of any of statements 22 to 24 wherein transmitting signalling to the first wireless communications system comprises transmitting signalling to a lead network element of the first wireless access communications system.

Statement 26. The method of any of statements 18 to 25 comprising operating the second wireless communications system to use a frequency-division-duplex mode.

Statement 27. Apparatus for controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the apparatus comprising
coordination circuitry configured to perform a group coordinated process comprising coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process.

Statement 28. The apparatus of statement 27 wherein the coordination circuitry is configured to coordinate the network elements of the first wireless communications system to identify a portion of spectrum which is available for assignment, in the spectrum assignment process, from the network elements of the first wireless communications system to the particular network element of the second wireless communications system.

Statement 29. The apparatus of statement 28 wherein the coordination circuitry is configured to coordinate the network elements of the first wireless communications system to identify a portion of spectrum which is the minimum amount of spectrum available for assignment from the network elements of the first wireless communications system.

Statement 30. The apparatus of statement 29 wherein the coordination circuitry is configured to analyse a traffic buffer load of each of the network elements of the first wireless communications system, to determine an amount of spectrum required by each of the network elements of the first wireless communications system in dependence on the respective traffic buffer load, to compare each required amount of spectrum for the respective network element with an amount of spectrum currently assigned to the first communications system to obtain a difference for each network element, and to select a minimum difference to identify the said minimum amount of spectrum.

Statement 31. The apparatus of statement 30 wherein wherein the coordination circuitry is configured to map the traffic buffer load of each of the network elements to the respective amount of spectrum using a look-up table.

Statement 32. The apparatus of statement 27 wherein the coordination circuitry is configured to coordinate the network elements of the first wireless communications system to identify a portion of spectrum which is required to be assigned from the particular network element of the second wireless communications system to the network elements of the first wireless communications system.

Statement 33. The apparatus of any of statements 27 to 32 wherein the coordination circuitry is configured to identify a portion of spectrum which is either available for assignment from each of the network elements of the first wireless communications system to the particular network element of the second wireless communications system, or required to be assigned from the particular network element of the second wireless communications system to each of the network elements of the first wireless communications system.

Statement 34. The apparatus of any of statements 27 to 33 wherein the coordination circuitry is configured to operate one of the network elements of the first wireless communications system to coordinate other network elements of the first wireless communications system.

Statement 35. The apparatus of statement 34 wherein the coordination circuitry is configured
to transmit from the one network element of the first wireless communications system to the other network elements signalling which indicates the start of the group coordinated process, in response to which each of the other network elements is to analyse its data currently awaiting transmission to determine an amount of bandwidth required for transmission of the data, and to transmit to the one network element signalling being indicative of its required amount of bandwidth; and
to receive the said signalling at the one network element from each of the other network elements.

Statement 36. The apparatus of statement 35 wherein the coordination circuitry is configured to analyse the data currently awaiting transmission from the one network element of the first wireless communications system to determine an amount of bandwidth required for transmission of the data.

Statement 37. The apparatus of statement 36 wherein the coordination circuitry is configured to compare the amount of bandwidth required by each of the network elements with an amount of spectrum currently assigned to the first communications system to obtain a difference for each network element, and to select the minimum difference.

Statement 38. The apparatus of statement 37 wherein the coordination circuitry is configured to transmit from the first wireless communications system to the second wireless communications system signalling indicating that a portion of spectrum corresponding in size to the minimum difference is either available for assignment from each network element of the first wireless communications system to the particular network element of the second wireless communications system, or requested to be assigned from the particular network element of the second wireless communications system to each network element of the first wireless communications system, in dependence on the polarity of the difference.

Statement 39. The apparatus of any of statements 34 to 38 wherein the one network element is a lead network element of the first wireless communications system.

Statement 40. The apparatus of any of statements 27 to 39 wherein the coordination circuitry is configured to perform the group coordinated process in response to the receipt of signalling from the second wireless communications system serving as a trigger to request the assignment of a specified amount of spectrum from the first wireless communications system to the particular network element of the second wireless communications system.

Statement 41. The apparatus of any of statements 27 to 39 wherein the coordination circuitry is configured to perform the group coordinated process periodically in order to trigger an instance of the spectrum assignment process.

Statement 42. The apparatus of any of statements 27 to 41 wherein the first wireless communications systems uses a time-division-duplex mode.

Statement 43. The apparatus of statement 42 comprising spectrum assignment circuitry configured to perform an instance of the spectrum assignment process following the group coordinated process, and to communicate the result of the spectrum assignment process to a synchronisation module of the first wireless communications system.

Statement 44. Apparatus for controlling spectrum use in a second wireless communications system which is operable to take part in a spectrum assignment process, in which process one of a first wireless communications system and the second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the apparatus comprising
identification circuitry configured to identify a portion of spectrum which is either available for assignment from the particular network element of the second wireless communications system to the network elements of the first wireless communications system, or required to be assigned from the network elements of the first wireless communications system to the particular network element of the second wireless communications system, in the spectrum assignment process.

Statement 45. The apparatus of statement 44 wherein the identification circuitry is configured to identify a portion of spectrum which is either available for assignment from each of the network elements of the first wireless communications system to the particular network element of the second wireless communications system, or required to be assigned from the particular network element of the second wireless communications system to each of the network elements of the first wireless communications system.

Statement 46. The apparatus of statement 44 or 45 wherein the identification circuitry is configured to analyse data currently awaiting transmission from the particular network element of the second wireless communications system to determine an amount of bandwidth required for transmission of the data.

Statement 47. The apparatus of statement 46 wherein the identification circuitry is configured to calculate a difference between an amount of spectrum currently assigned to the particular network element of the second wireless communications system and the amount of bandwidth required by the particular network element.

Statement 48. The apparatus of statement 47 wherein the identification circuitry is configured to transmit from the second wireless communications system to the first wireless communications system signalling indicating that a portion of spectrum corresponding in size to the calculated difference is either available for assignment from the particular network element of the second wireless communications system to the first wireless communications system, or requested to be assigned from the first wireless communications system to the particular network element of the second wireless communications system, in dependence on the polarity of the difference.

Statement 49. The apparatus of any of statements 44 to 48 wherein the identification circuitry is configured to identify the portion of spectrum in response to the receipt of signalling from the first wireless communications system serving as a trigger to request the assignment of a specified amount of spectrum from the particular network element of the second wireless communications system to the first wireless communications system.

Statement 50. The apparatus of statement 49 wherein the identification circuitry is configured to identify the portion of spectrum periodically in order to trigger an instance of the spectrum assignment process.

Statement 51. The apparatus of any of statements 48 to 50 wherein the identification circuitry is configured to transmit signalling to a lead network element of the first wireless access communications system.

Statement 52. The apparatus of any of statements 44 to 51 wherein the second wireless communications system uses a frequency-division-duplex mode.

Statement 53. A method of controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band using a time-division-duplex arrangement, the second wireless communications system using a frequency-division-duplex arrangement, the method comprising performing a group coordinated process comprising coordinating the network elements of the first wireless communications system to identify a portion of spectrum which is available for assignment from the first wireless communications system to the particular network element of the second wireless communications system;

assigning the identified portion of spectrum from the first wireless communications system to the particular network element of the second wireless communications system in the spectrum assignment process;

transmitting to a synchronisation module of the first wireless communications system signalling being indicative of a spectrum configuration following the spectrum assignment process; and operating the first wireless communications system to switch to the said spectrum configuration in coordination with the activities of the synchronisation module.

Statement 54. Apparatus for controlling spectrum use in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band using a time-division-duplex arrangement, the second wireless communications system using a frequency-division-duplex arrangement, the apparatus comprising coordination circuitry configured to perform a group coordinated process comprising coordinating the network elements of the first wireless communications system to identify a portion of spectrum which is available for assignment from the first wireless communications system to the particular network element of the second wireless communications system;

spectrum assignment circuitry configured to assign the identified portion of spectrum from the first wireless communications system to the particular network element of the second wireless communications system in the spectrum assignment process;

the spectrum assignment circuitry being configured further to transmit to a synchronisation module of the first wireless communications system signalling being indicative of a spectrum configuration following the spectrum assignment process; and control circuitry configured to operate the first wireless communications system to switch to the said spectrum configuration in coordination with the activities of the synchronisation module.

Statement 55. A computer program which, when run on a computer forming part of a network element or an external controlling element, causes the computer to perform the method as in any of statements 1 to 26 or 53.

Statement 56. A computer program which, when loaded into a computer forming part of a network element or an external controlling element, causes the computer to become the apparatus as in any of statements 27 to 52 or 54.

Statement 57. A computer program as in statements 55 or 56, carried by a carrier medium.

Statement 58. The computer program of statement 57, wherein the carrier medium is a recording medium.

Statement 59. The computer program of statement 57, wherein the carrier medium is a transmission medium.

The invention claimed is:

1. A method of controlling spectrum use comprising:

performing a group coordinated process in a first wireless communications system which is configured to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, said performing a group coordinated process comprising:

by coordinating network elements of the first wireless communications system, identifying a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process;

wherein coordinating the network elements of the first wireless communications system comprises:

operating one of the network elements of the first wireless communications system to coordinate other network elements of the first wireless communications system;

transmitting from the one network element of the first wireless communications system to the other network elements signaling which indicates the start of the group coordinated process, in response to receiving said signaling, analyzing at each of the other network elements its data currently awaiting transmission, determining an amount of bandwidth required for transmission of the data based on said analyzing, and transmitting to the one network element signaling being indicative of its required amount of bandwidth;

at the one network element, receiving the signaling from each of the other network elements;

analyzing the data currently awaiting transmission from the one network element of the first wireless communications system and determining an amount of bandwidth required for transmission of the data based on said analyzing; and comparing the amount of bandwidth required by each of the network elements with an amount of spectrum currently assigned to the first communications system, obtaining based on the comparison, a difference for each network element, and selecting the minimum difference.

2. The method of claim 1 comprising, in the group coordinated process, coordinating the network elements of the first wireless communications system to identify a portion of spectrum which is available for assignment, in the spectrum assignment process, from the network elements of the first wireless communications system to the particular network element of the second wireless communications system.

3. The method of claim 2 wherein coordinating the network elements of the first wireless communications system to identify the portion of spectrum comprises identifying a portion of spectrum which is the minimum amount of spectrum available for assignment from the network elements of the first wireless communications system.

4. The method of claim 3 wherein identifying the portion of spectrum which is the minimum amount of spectrum available for assignment from the network elements of the first wireless communications system comprises analyzing a traffic buffer load of each of the network elements of the first wireless communications system, determining an amount of spectrum required by each of the network elements of the first wireless communications system in dependence on the respective traffic buffer load, comparing each required amount of spectrum for the respective network element with an amount of spectrum currently assigned to the first communications system to obtain a difference for each network element, and selecting a minimum difference to identify the minimum amount of spectrum available for assignment.

5. The method of claim 4 wherein determining the amount of spectrum required by each of the network elements of the first wireless communications system in dependence on the respective traffic buffer load comprises mapping the traffic buffer load of each of the network elements to the respective amount of spectrum using a look-up table.

6. The method of claim 1 comprising, in the group coordinated process, coordinating the network elements of the first wireless communications system to identify a portion of spectrum which is required to be assigned from the particular network element of the second wireless communications system to the network elements of the first wireless communications system.

7. The method of claim 1 further comprising:

transmitting from the first wireless communications system to the second wireless communications system signaling indicating that a portion of spectrum corresponding in size to the minimum difference is either available for assignment from each network element of the first wireless communications system to the particular network element of the second wireless communications system, or requested to be assigned from the particular network element of the second wireless communications system to each network element of the first wireless communications system, in dependence on the polarity of the difference.

8. The method of claim 1 comprising performing the group coordinated process in response to the receipt of signaling from the second wireless communications system serving as a trigger to request the assignment of a specified amount of spectrum from the first wireless communications system to the particular network element of the second wireless communications system.

9. The method of claim 1 comprising performing the group coordinated process periodically in order to trigger an instance of the spectrum assignment process.

10. The method of claim 1 comprising operating the first wireless communications systems to use a time-division-duplex mode; and performing an instance of the spectrum assignment process following the group coordinated process, and communicating the result of the spectrum assignment process to a synchronization module of the first wireless communications system.

11. An apparatus for controlling spectrum comprising:

coordination circuitry configured to perform a group coordinated process in a first wireless communications system which is configured to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, the group coordinating process comprising coordinating network elements of the first wireless communications system to identify a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process;

the coordination circuitry further configured to:

operate one of the network elements of the first wireless communications system coordinating other network elements of the first wireless communications system;

transmit from the one network element of the first wireless communications system to the other network elements signaling which indicates the start of the group coordinated process, the signaling is configured to cause each of the other network elements to analyze its data currently awaiting transmission and determine an amount of bandwidth required for transmission of the data based on said analyzing, and to transmit to the one network element signaling being indicative of its required amount of bandwidth;

the coordination circuitry is configured to instruct the one network element, upon receiving the signaling from each of the other network elements to:

analyze the data currently awaiting transmission from the one network element of the first wireless communications system, determining an amount of bandwidth required for transmission of the data based on said analyzing; and compare the amount of bandwidth required by each of the network elements with an amount of spectrum currently assigned to the first communications system, obtain a difference for each network element, and select the minimum difference.

12. A non-transitory computer-readable medium storing a computer program which, when run on a computer forming part of a network element or an external controlling element, causes the computer to perform a method of controlling spectrum, the method comprising:

performing a group coordinated process in a first wireless communications system which is operable to take part in a spectrum assignment process, in which process one of the first wireless communications system and a second wireless communications system assigns a portion of spectrum to the other of the first wireless communications system and the second wireless communications system, the first wireless communications system comprising a plurality of network elements, some or all of which are located within a cell associated with a particular network element of the second wireless communications system, the network elements of the first wireless communications system all operating within the same spectrum band when in use, The group coordinated process comprising coordinating network elements of the first wireless communications system and identifying a portion of spectrum which is either available for assignment from the network elements of the first wireless communications system to the particular network element of the second wireless communications system, or required to be assigned from the particular network element of the second wireless communications system to the network elements of the first wireless communications system, in the spectrum assignment process;

wherein coordinating the network elements of the first wireless communications system comprises:

operating one of the network elements of the first wireless communications system to coordinate other network elements of the first wireless communications system;

transmitting from the one network element of the first wireless communications system to the other network elements signaling which indicates the start of the group coordinated process, in response to receiving said signaling, analyzing at each of the other network elements its data currently awaiting transmission, determining an amount of bandwidth required for transmission of the data based on said analyzing, and transmitting to the one network element signaling being indicative of its required amount of bandwidth;

at the one network element, receiving the signaling from each of the other network elements;

analyzing the data currently awaiting transmission from the one network element of the first wireless communications system and determining an amount of bandwidth required for transmission of the data based on said analyzing; and comparing the amount of bandwidth required by each of the network elements with an amount of spectrum currently assigned to the first communications system, obtaining based on the comparison, a difference for each network element, and selecting the minimum difference.

* * * * *